United States Patent [19]

Nakano

[11] Patent Number: 4,839,504
[45] Date of Patent: Jun. 13, 1989

[54] IC CARD SYSTEM COMPATIBLE WITH BANK ACCOUNT SYSTEM

[75] Inventor: Harumi Nakano, Oome, Japan

[73] Assignee: Casio Computer Co., Ltd., Tokyo, Japan

[21] Appl. No.: 75,064

[22] Filed: Jul. 17, 1987

[30] Foreign Application Priority Data

Jul. 28, 1986 [JP] Japan .................. 61-177442

[51] Int. Cl.$^4$ .......................... G06F 15/30
[52] U.S. Cl. .................................. 235/379
[58] Field of Search ................. 235/379, 380

[56] References Cited

U.S. PATENT DOCUMENTS 3,906,460 9/1975 Halpern .
3,971,916 7/1976 Moreno .
4,105,156 8/1978 Dethloff .
4,211,919 7/1980 Ugon .
4,382,279 5/1983 Ugon .
4,736,094 4/1988 Yoshida .................. 235/379

Primary Examiner—Roy N. Envall, Jr.
Attorney, Agent, or Firm—Frishauf, Holtz, Goodman & Woodward

[57] ABSTRACT

In an IC card system, a first file corresponding to a normal bank account and a second file corresponding to an IC card account are provided for each IC cardholder. A card terminal for receiving an IC card communicates in an on-line manner with a host computer installed in a bank. A deposit amount is transferred between the first and second files for a transaction using the IC card. The IC card stores an account list for the transfer of a remittance to an account of a third party, so that a cash transfer from the first or second file to the account of the third party can be performed. The IC card functions both as a debit card and a credit card. When either of these functions is selected, an off-line transaction involving use of the IC card can be performed.

8 Claims, 27 Drawing Sheets

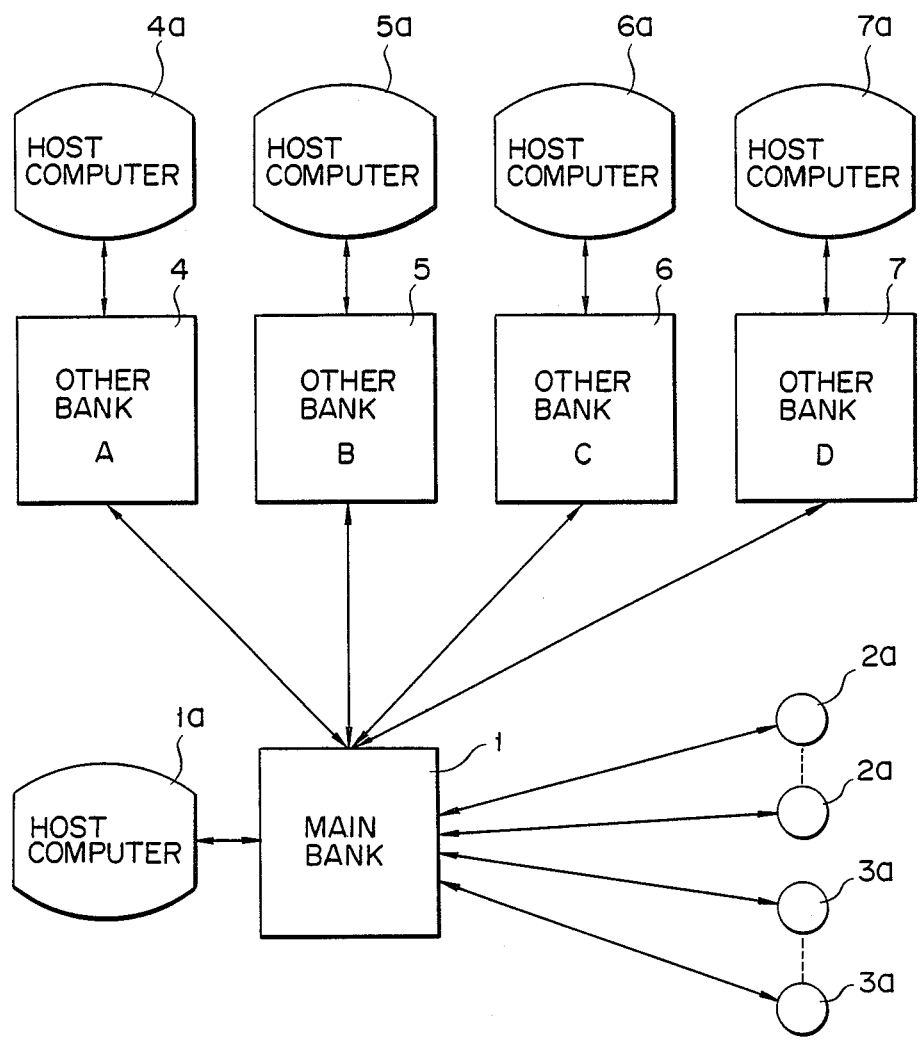
F I G. 1

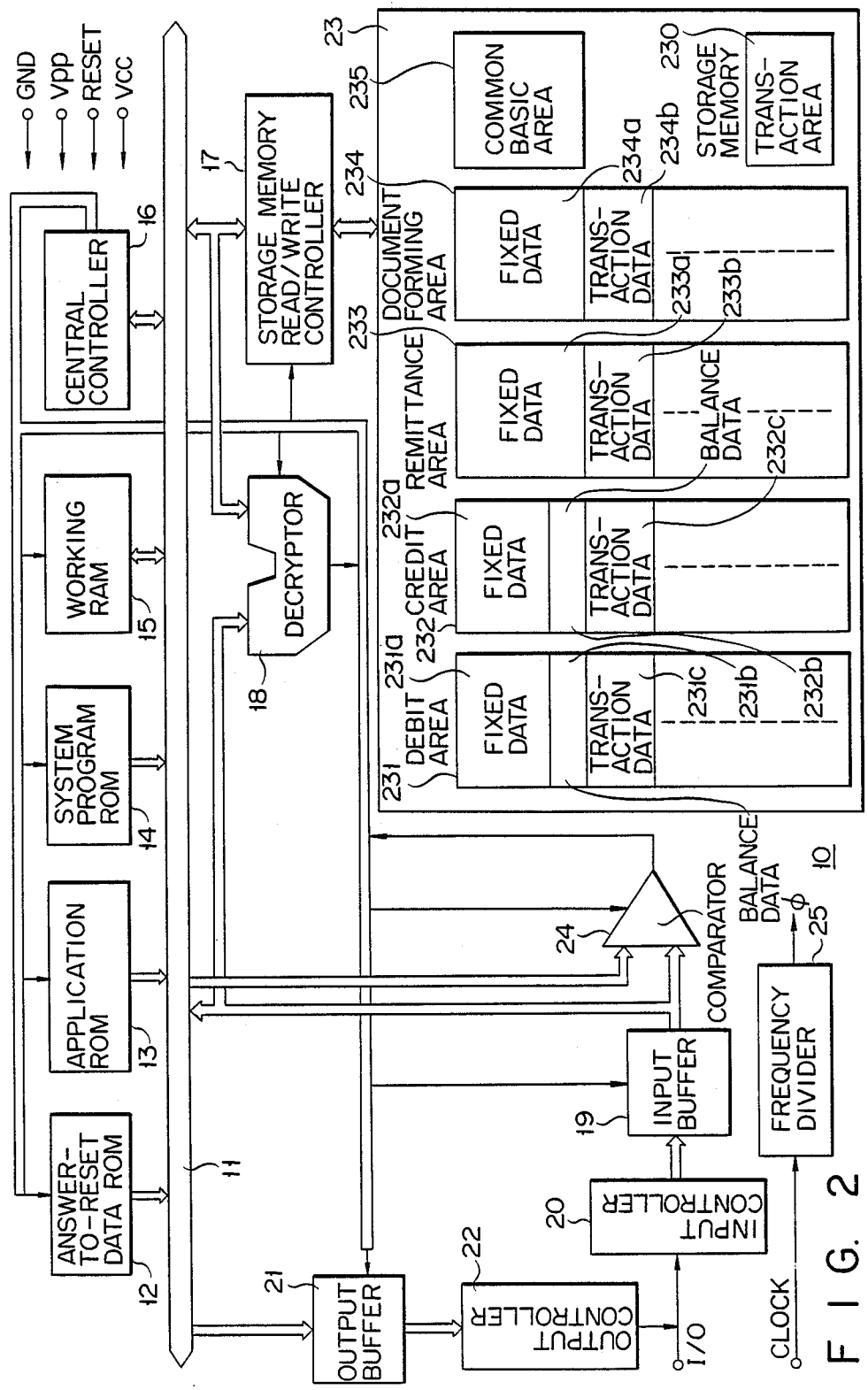
F I G. 2

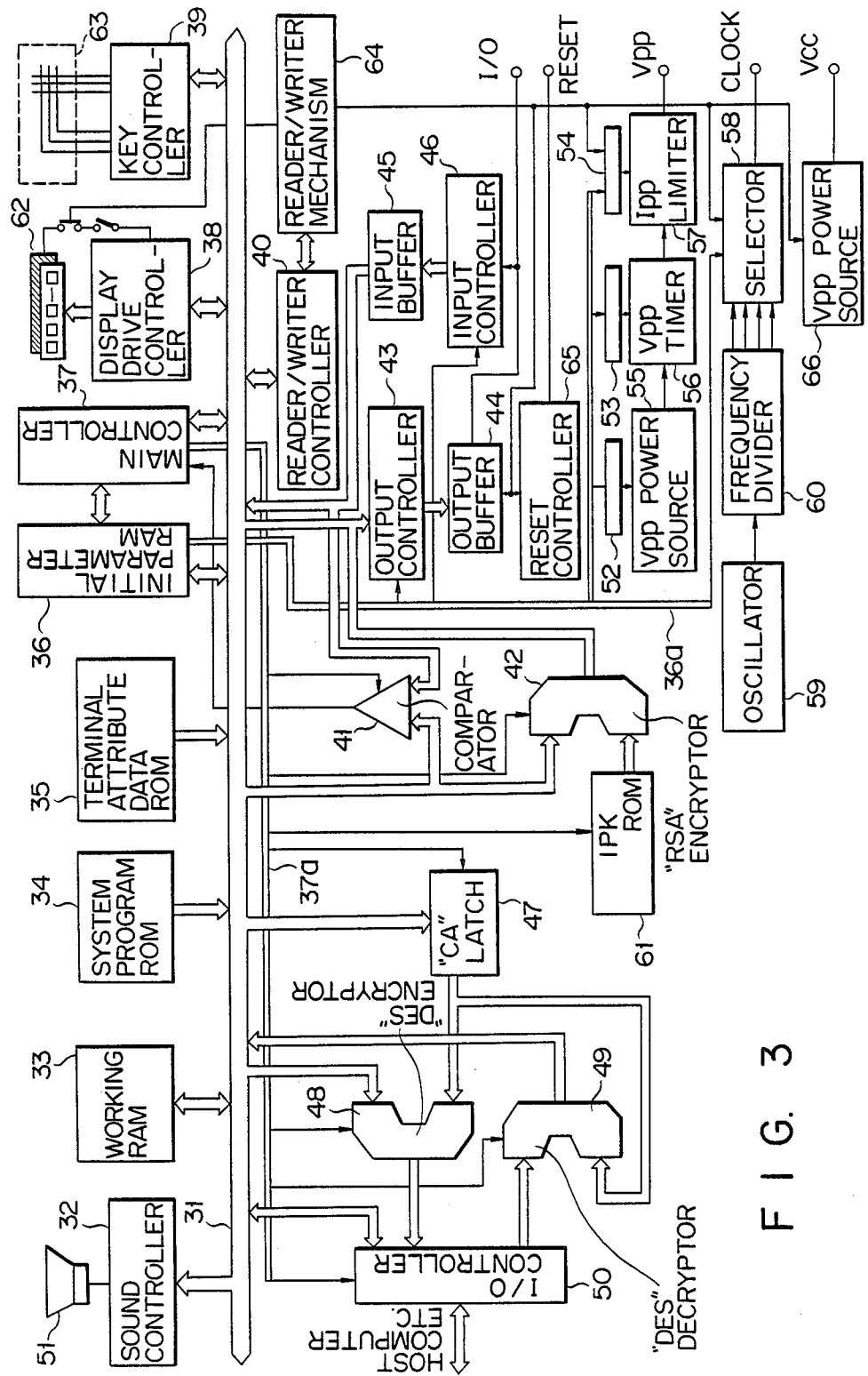
F I G. 3

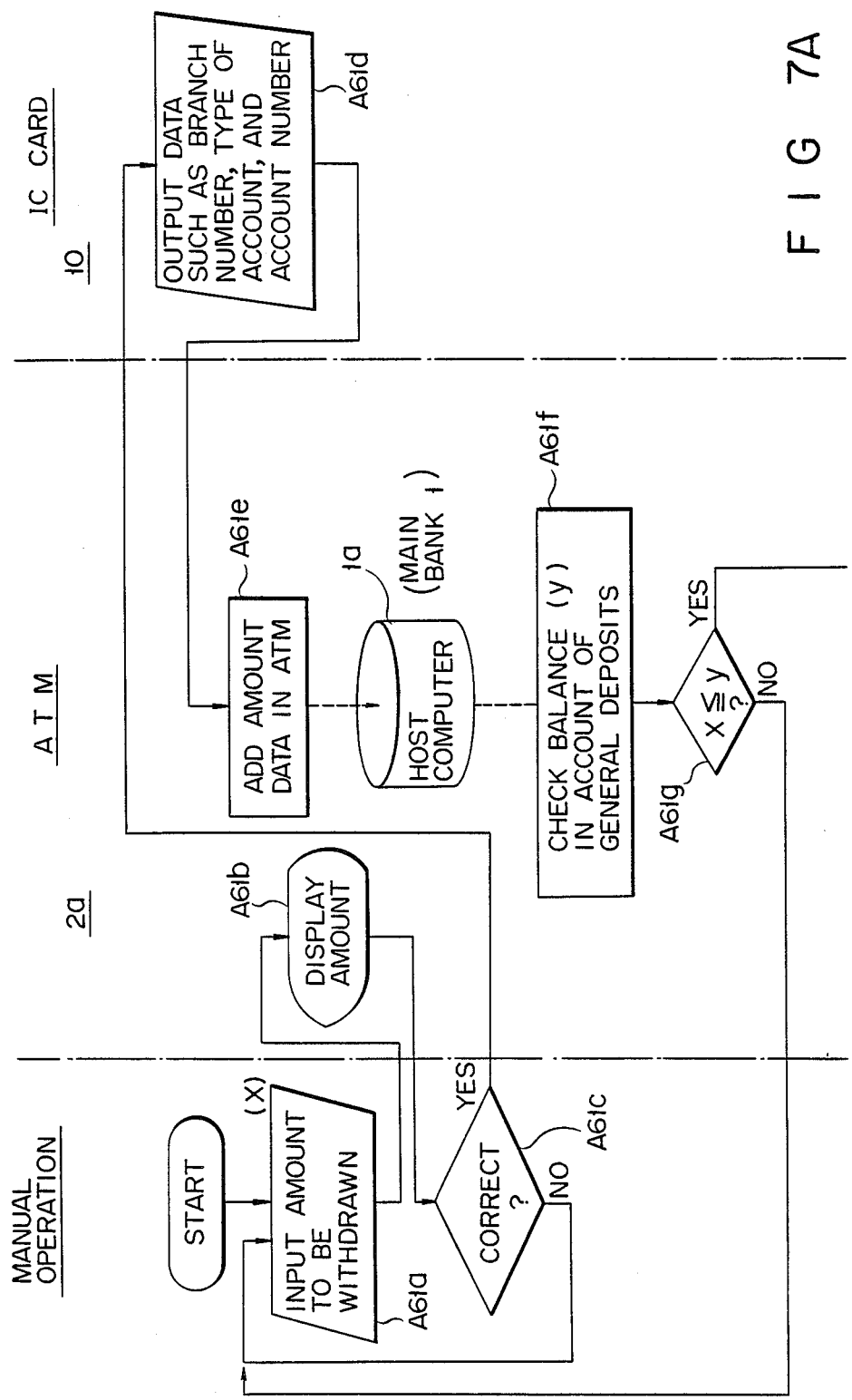

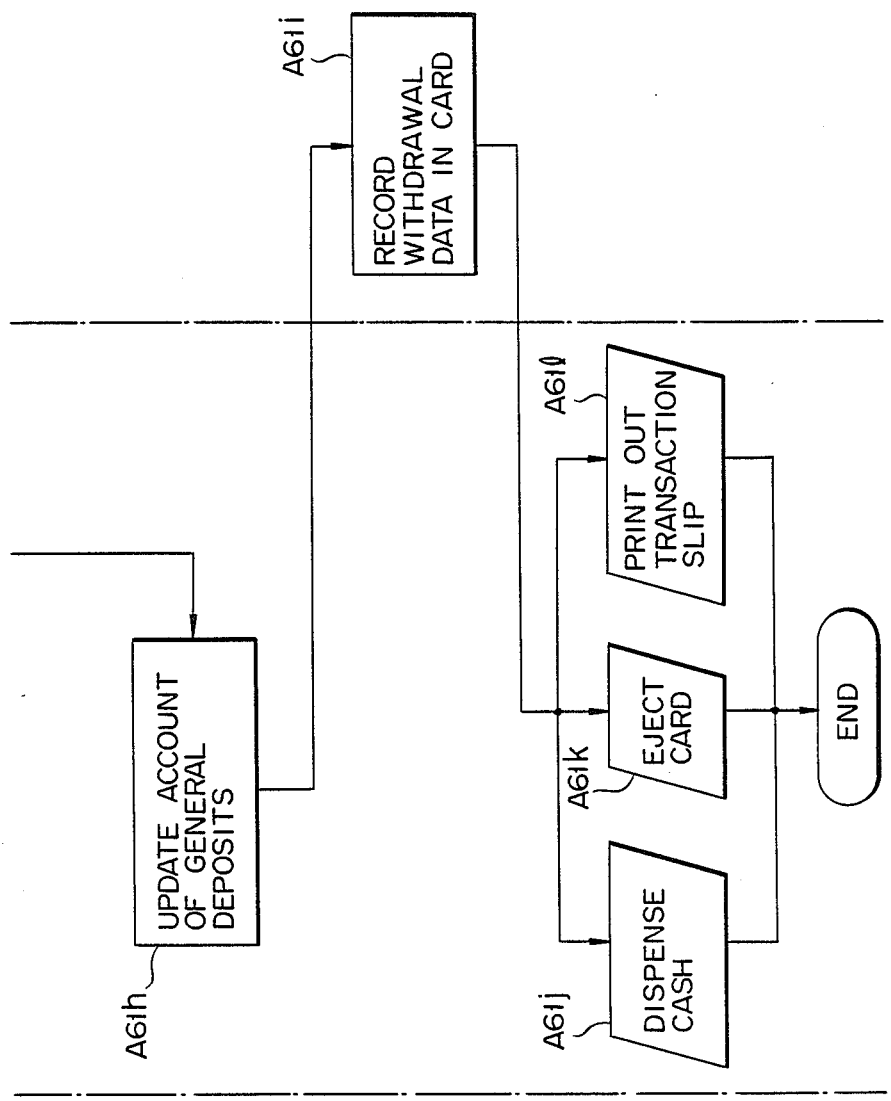

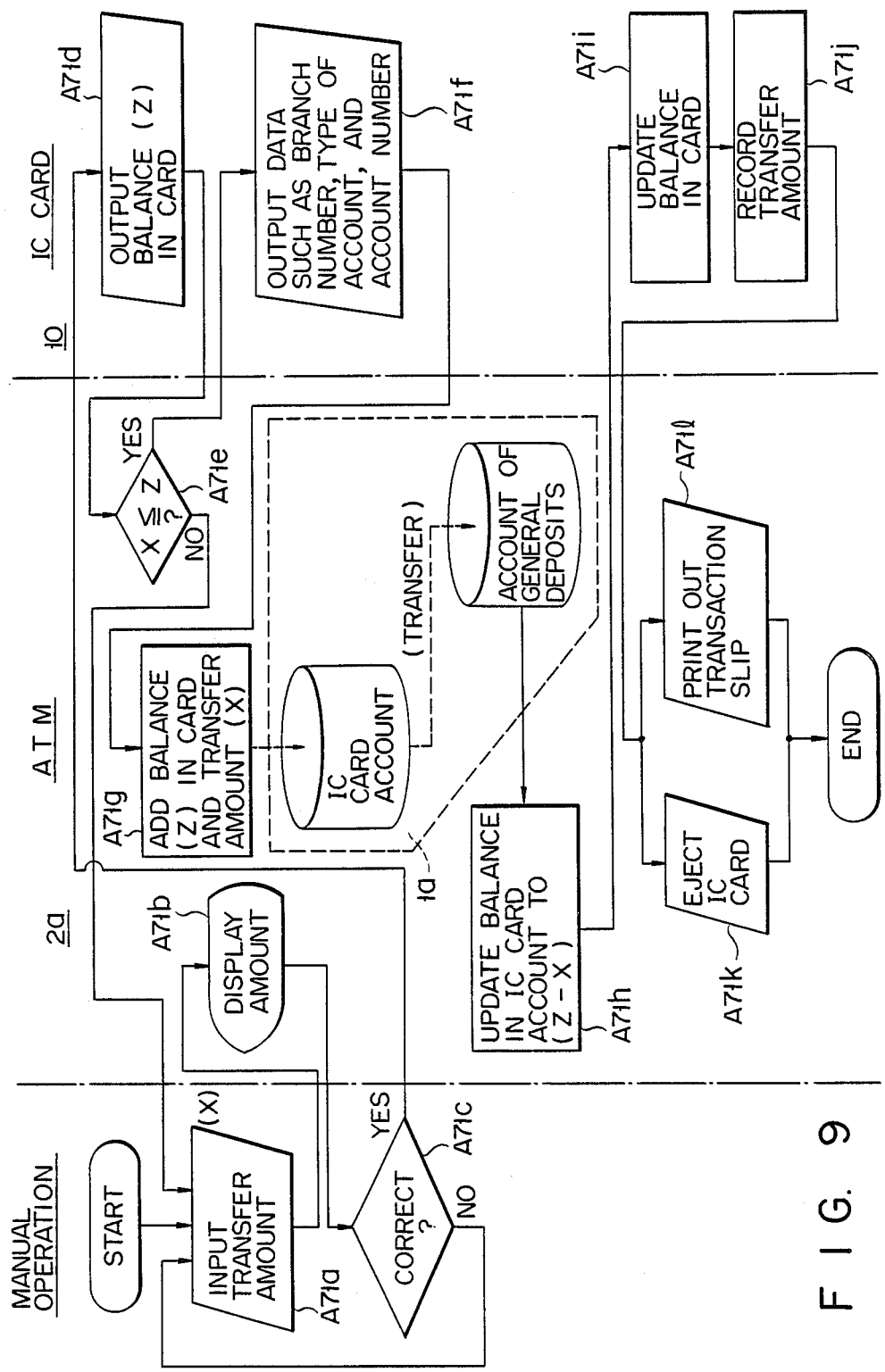
F I G. 9

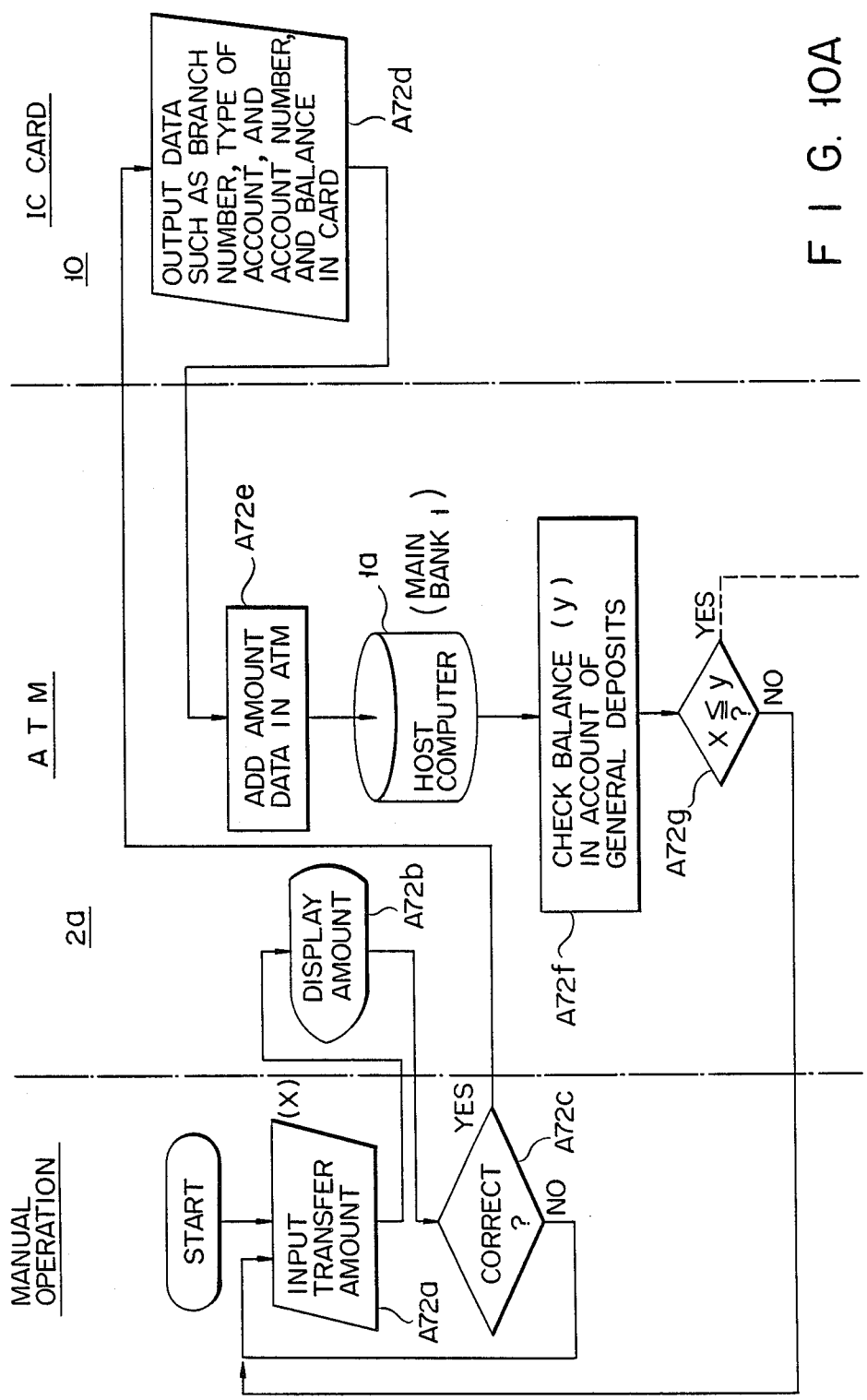

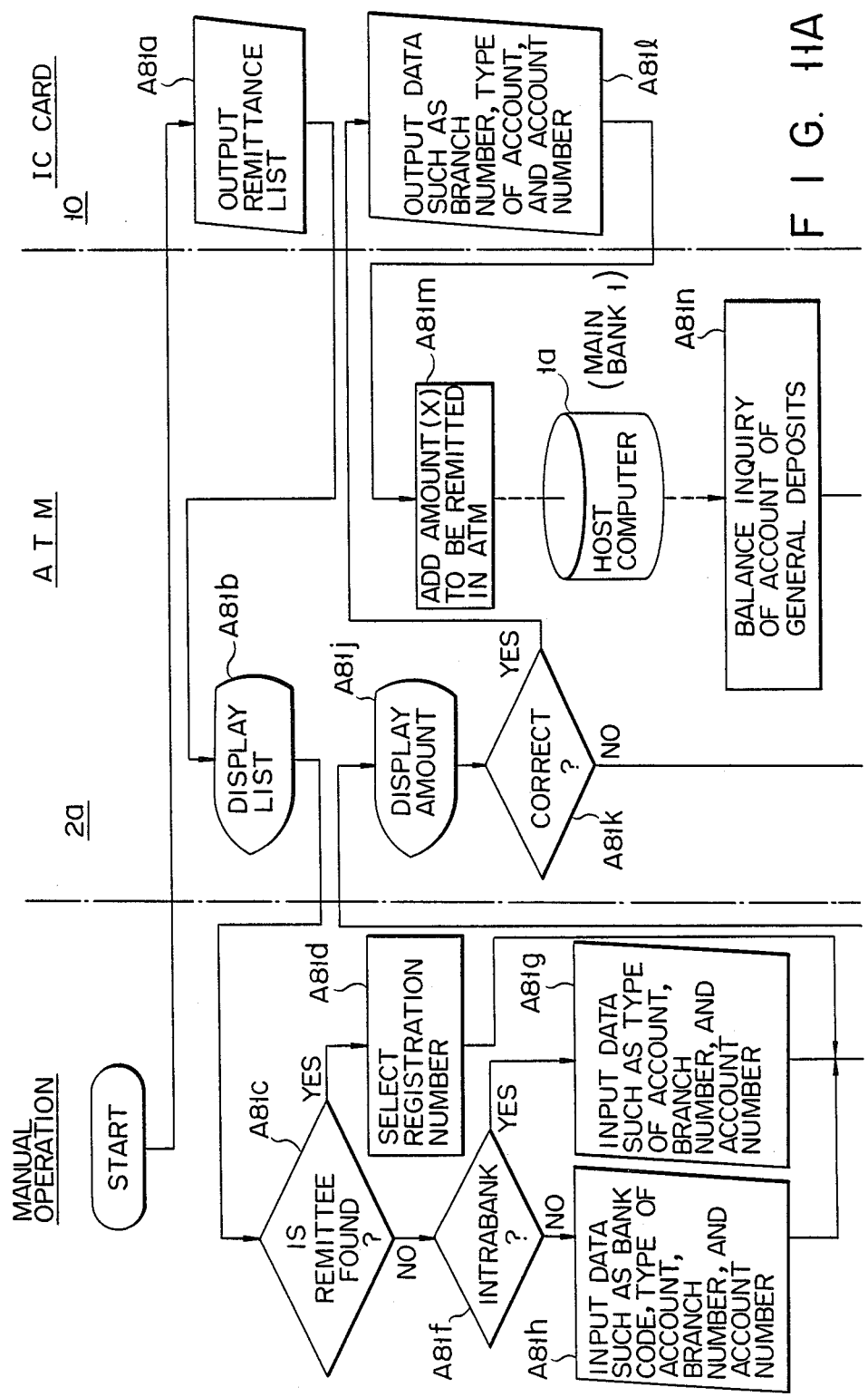

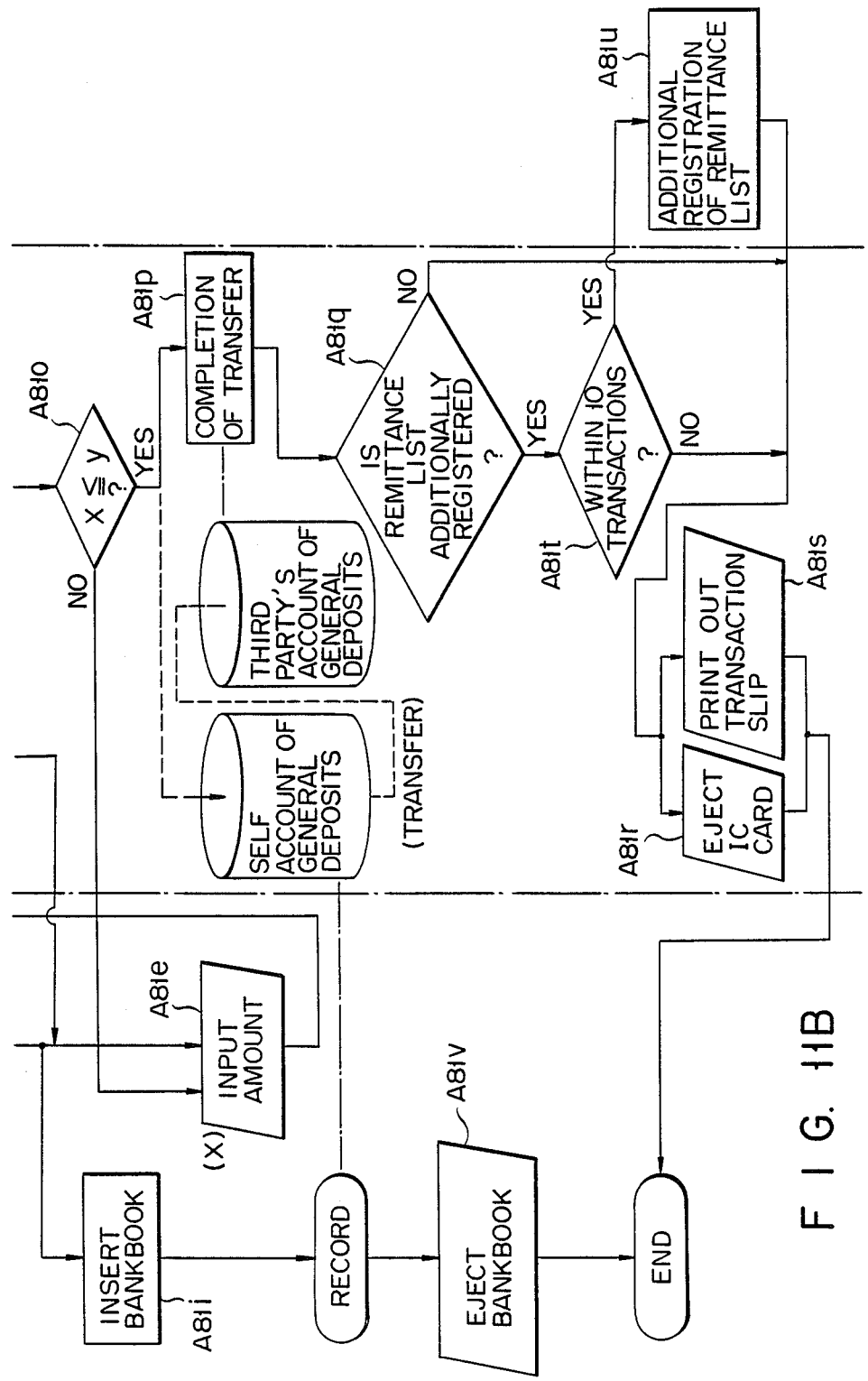
F I G. 11B

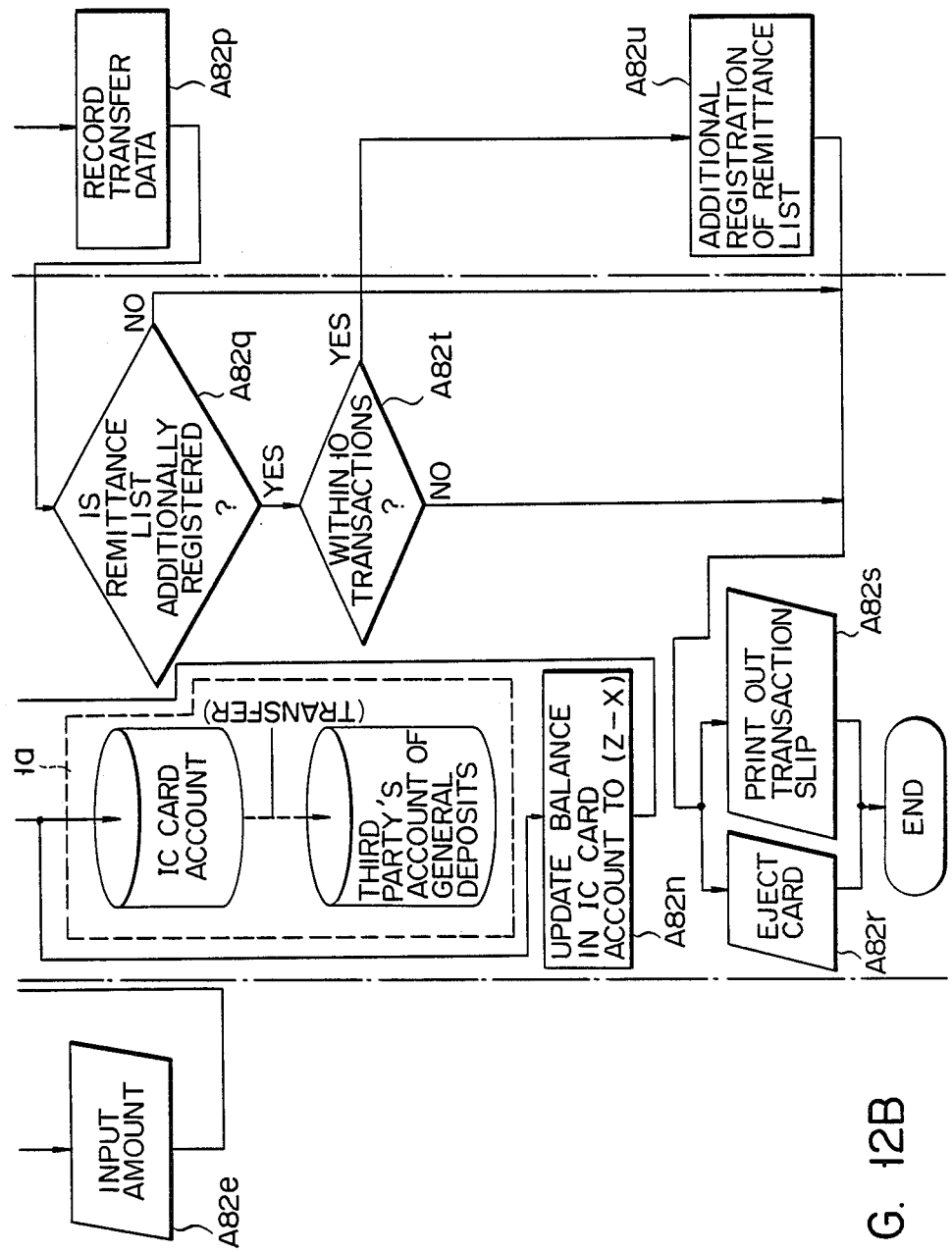
F I G. 12B

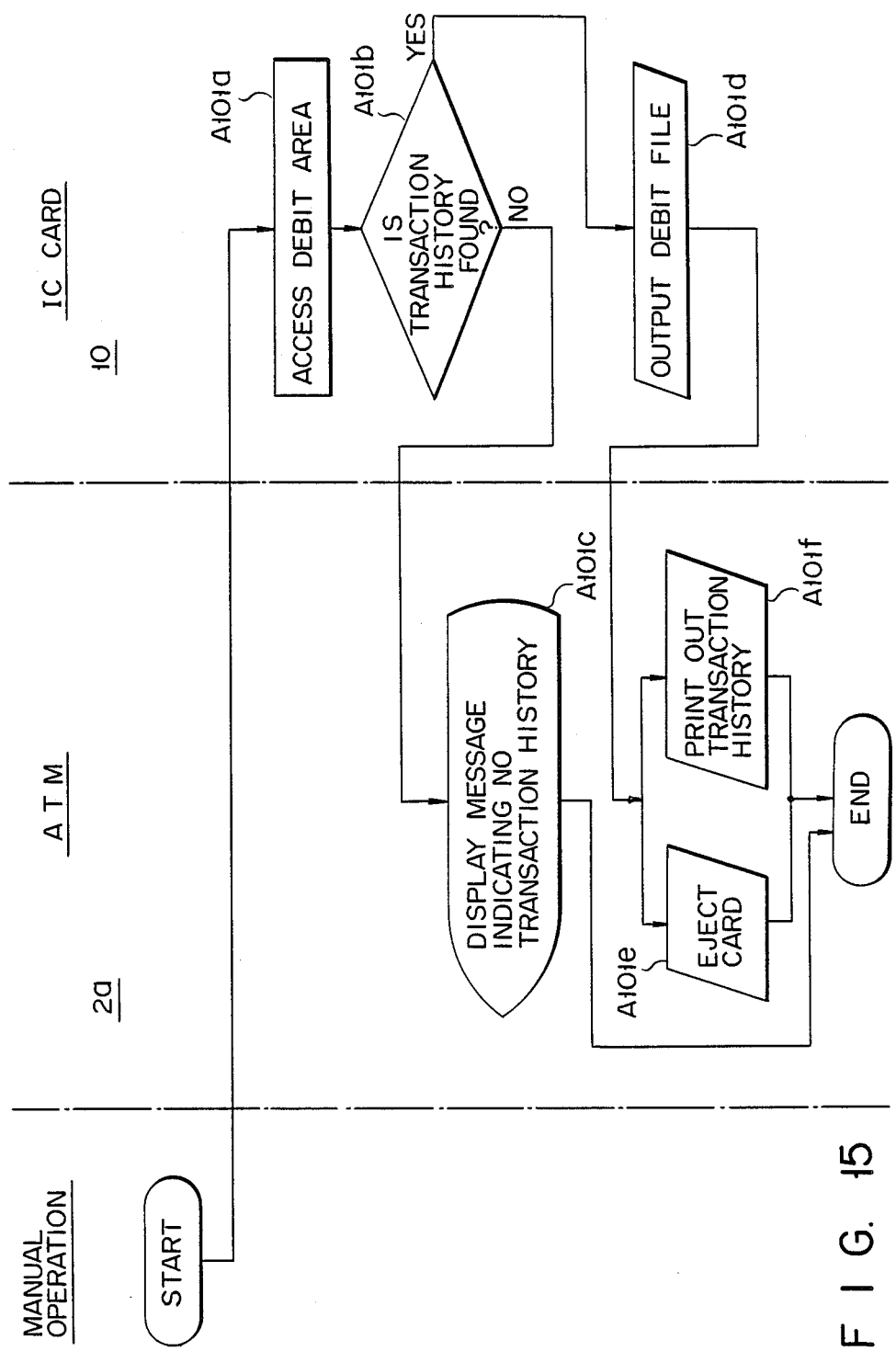
F I G. 15

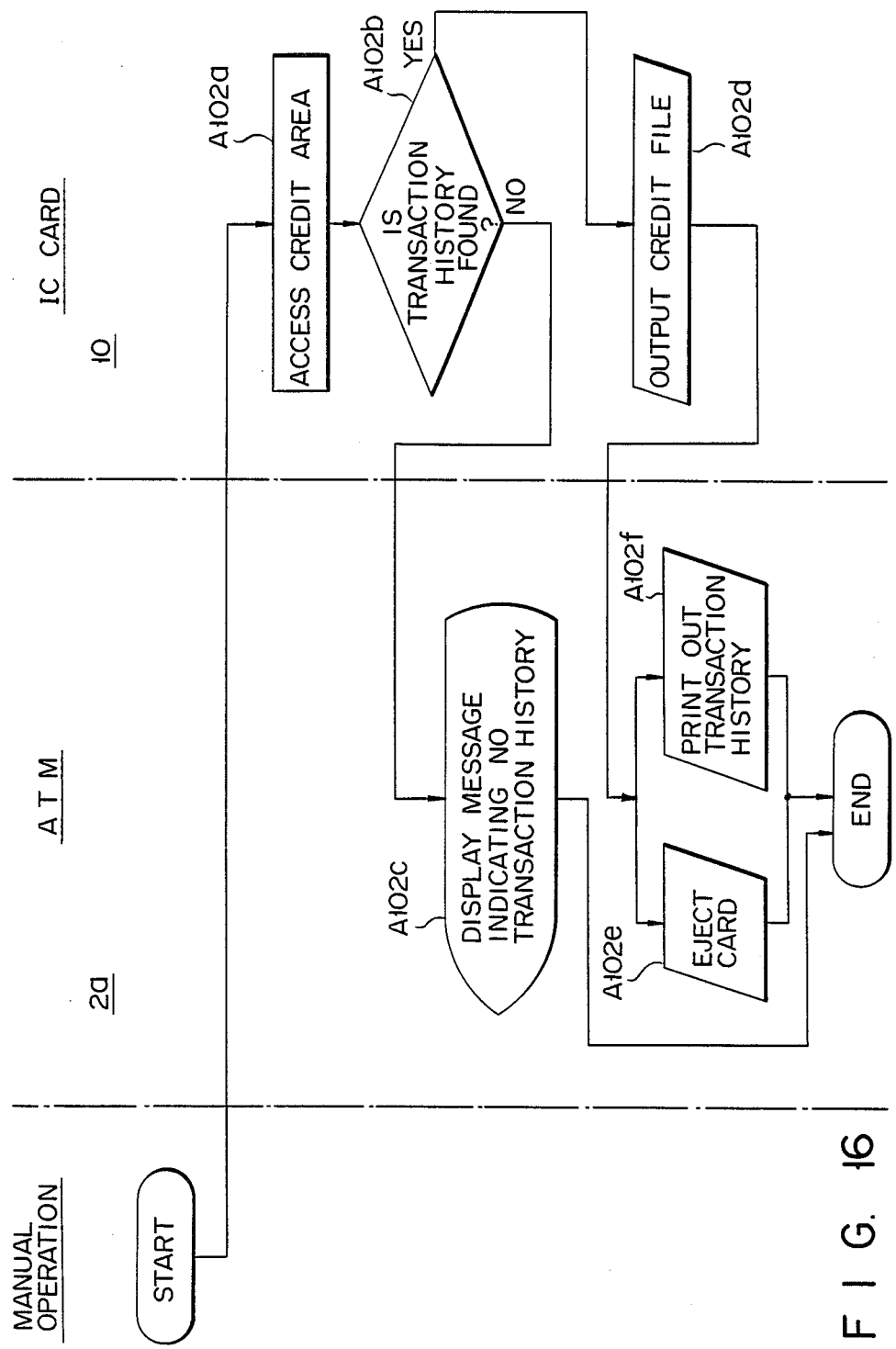
F I G. 16

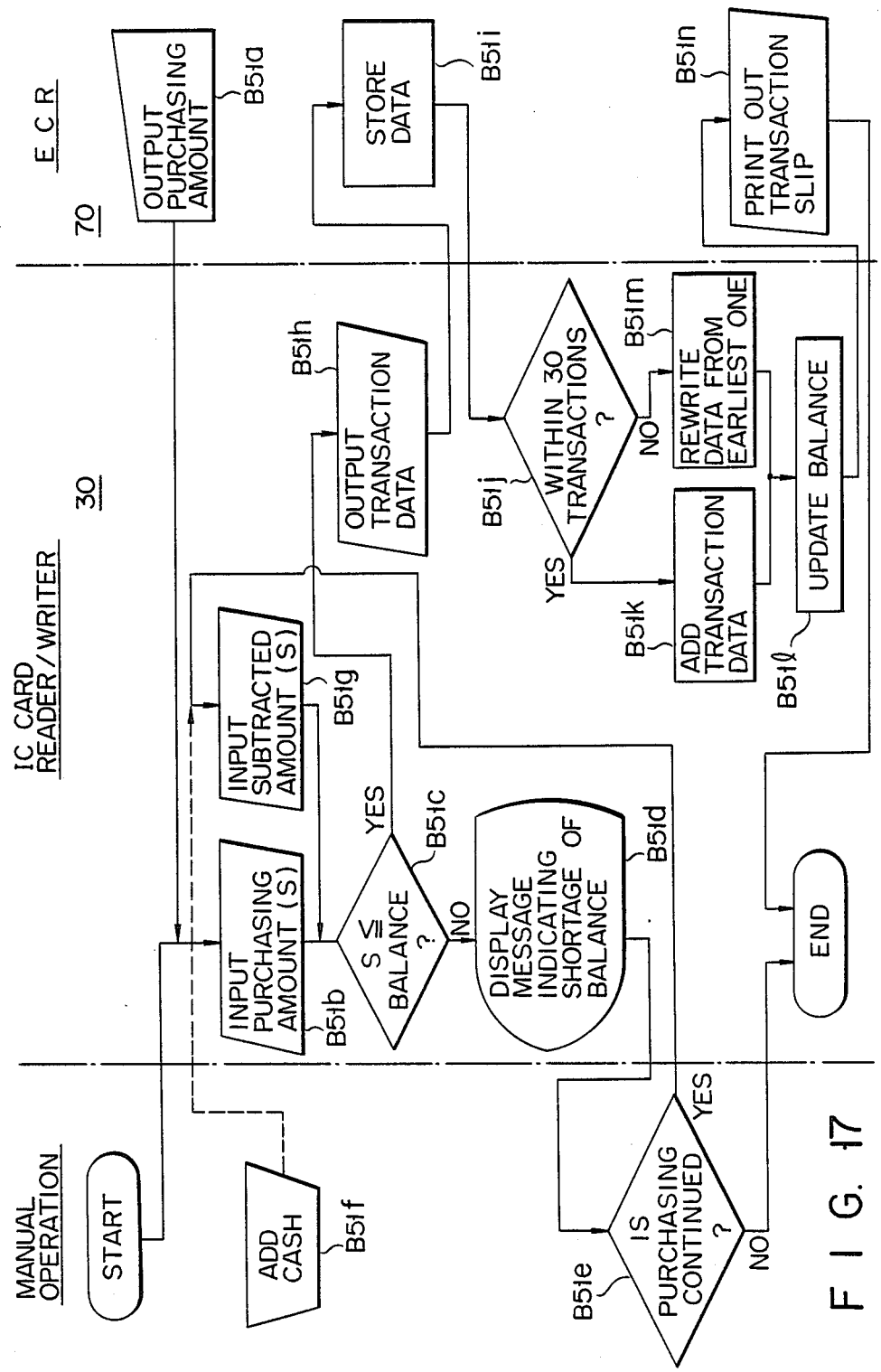
F I G. 17

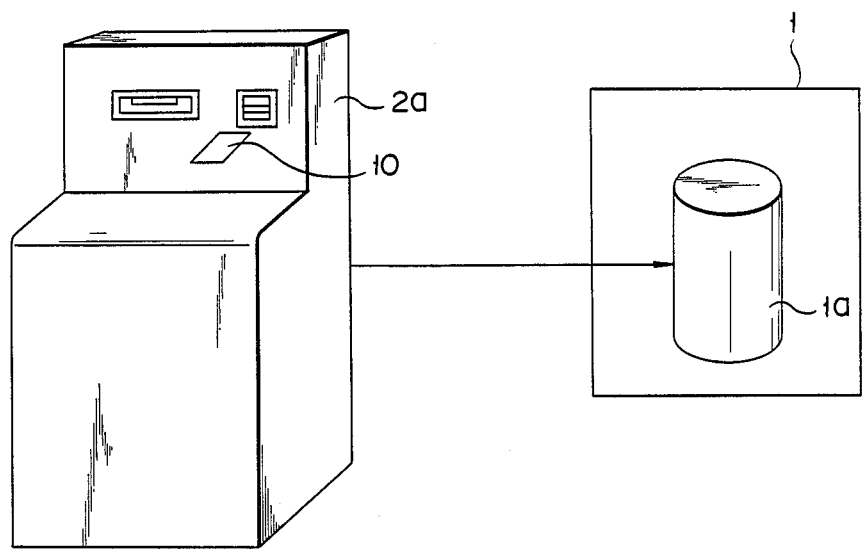
F I G. 19

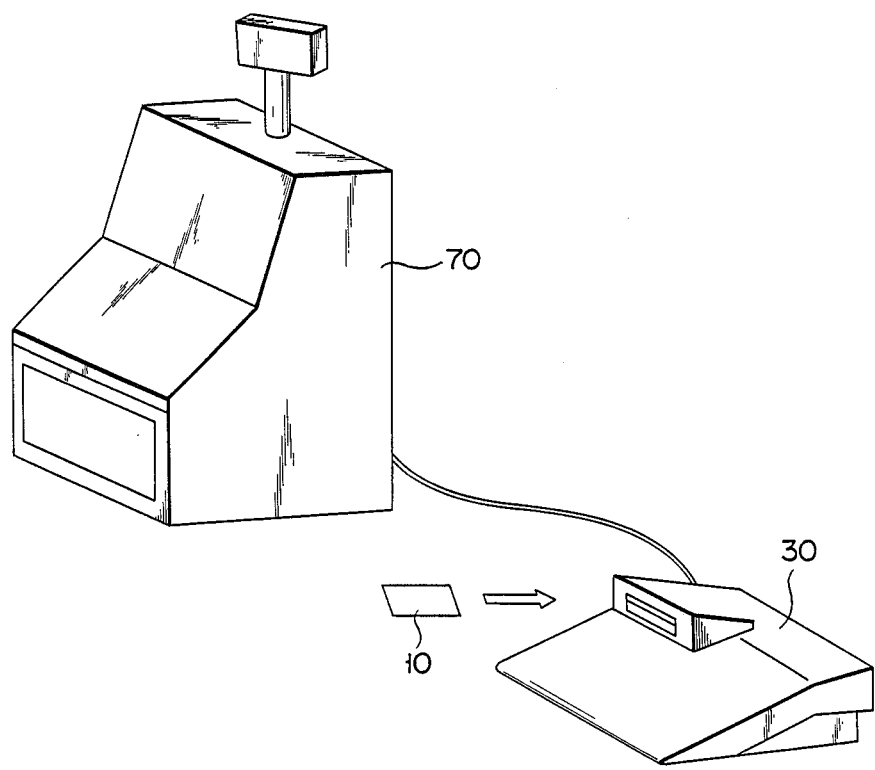
F I G. 20

|  | DEBIT CARD | CREDIT CARD | REMITTANCE CARD | FORM CREATING CARD |
|---|---|---|---|---|
| BASIC DATA | ○ NAME<br>○ POSTAL CODE<br>○ ADDRESS<br>○ TELEPHONE NUMBER | ○ NAME<br>○ POSTAL CODE<br>○ ADDRESS<br>○ TELEPHONE NUMBER | ○ NAME<br>○ POSTAL CODE<br>○ ADDRESS<br>○ TELEPHONE NUMBER | ○ NAME<br>○ POSTAL CODE<br>○ ADDRESS<br>○ TELEPHONE NUMBER |
| FIXED DATA | ○ BANK CODE<br>○ PIN<br>○ BRANCH NUMBER<br>○ TYPE OF ACCOUNT<br>○ ACCOUNT NUMBER<br>○ VERIFICATION CODE<br>○ INVALID CODE | ○ PIN<br>○ COMPANY CODE<br>○ MEMBERSHIP NUMBER<br>○ VALID DATE<br>○ INVALID CODE<br>○ FLOOR LIMIT<br>○ CREDIT LIMIT | ○ BANK CODE<br>○ PIN<br>○ BRANCH NUMBER<br>○ TYPE OF ACCOUNT<br>○ ACCOUNT NUMBER<br>○ VERIFICATION CODE<br>○ INVALID CODE | FIXED DATA<br>OF DEBIT CARD<br>+<br>○ OFFICE DATA<br>○ FAMILY DATA<br>○ ASSET DATA |
| BALANCE DATA | ○ BALANCE IN CARD | ○ CREDIT BALANCE |  |  |
| TRANS-ACTION DATA | ○ DATE<br>○ TYPE OF TRANSACTION<br>○ DESTINATION<br>○ TERMINAL NUMBER<br>○ DEPOSIT/WITHDRAWAL CLASSIFICATION<br>○ AMOUNT | ○ DATE<br>○ TYPE OF ACCOUNT<br>○ DESTINATION<br>○ TERMINAL NUMBER<br>○ AMOUNT | ○ DATE<br>○ TYPE OF ACCOUNT<br>○ BRANCH NUMBER<br>○ ACCOUNT NUMBER<br>○ AMOUNT<br>○ REGISTRATION NUMBER<br>○ NAME | ○ DATE<br>○ TYPE OF ACCOUNT<br>○ TRANSACTION NUMBER |

F I G. 21

IC CARD SYSTEM COMPATIBLE WITH BANK ACCOUNT SYSTEM

BACKGROUND OF THE INVENTION

1. Field of the Invention

The present invention relates to an IC card system compatible with an existing bank account system.

2. Description of the Prior Art

Recent times have come to be known as the "cashless age", where people can purchase commodities without paying in cash; instead using a credit card issued by a credit card company.

Known examples of conventional credit cards include bank cards, plastic cards, embossed cards, magnetic stripe cards, and the like. However, due to their particular structure, these cards can be easily forged and then use illegally.

In order to solve the above problems, as described in U.S. Pat. Nos. 3,906,460, 3,971,916, 4,105,156, 4,211,919, and 4,382,279, an IC (integrated circuit) card has been proposed wherein an IC circuit storing a personal identification number (also known as a "PIN") and the like is built into a card so as not to read out the personal identification number. Such an IC card system, combining the IC card and card terminal, has been developed.

In view of the recent practical application of the IC card system, introduction of IC card system is discussed in banks.

Conventional IC card systems are quite different from an existing bank account system. Therefore, the existing system cannot be directly used, and an economical loss is considerable.

Since, in a conventional bank account system using a magnetic stripe card, the on-line system is suspended during holidays and at night, real-time account transactions cannot be performed, and improvement thereof is also demanded.

In the conventional bank account system using the magnetic stripe card, a customer wishing to pay money into the account of a third party must fill out a specified bank form, including such details as the payee's account number and the like, and then take it to a cashier.

Obviously, such a transaction is cumbersome and time-consuming, and sometimes is rejected because of erroneous filling out of the form. The inconvenience of performing such a transaction becomes even more apparent when it must be carried out on a regular basis— for example, when it is the same payee in each transaction. Naturally, therefore, anything which offers to simplify, and thus speed-up, such transactions would be welcomed.

In addition, since many of the above cards are designed for a specific purpose, such as a credit card, a debit card, and so forth, this will often result in the cardholder having to carry a number of different cards at all times, with the inconvenience that this entails.

The present invention has been conceived in consideration of the above situation, and has as its object to provide an IC card system which is compatible with an existing bank account system without great expenditure and which allows off-line transactions to be performed by use of an IC card.

Another object of the present invention is to provide an IC card system which enables simple, error-free payment to be made into a specified bank account, by using data associated with remittance operation stored in an IC card.

A further object of the present invention is to provide an IC card system in which a single IC card can function as a credit card, a debit card, and the like, thereby simplifying the cardholder's card-carrying requirements and resulting in greater convenience of use.

SUMMARY OF THE INVENTION

These and other objects of the invention are achieved by an IC card system which comprises an IC card device which contains at least one IC (integrated circuit) chip having a first memory for storing transaction data, a second memory for storing a personal identification number (PIN), and a comparator for comparing the PIN data stored in the second memory with an externally entered PIN. The IC card system additionally comprises a terminal device for communicating various items of data to the IC card device when the card is inserted therein and electrically connected thereto, and a host computer which is installed in a bank, is coupled in an on-line manner to the terminal device, and has a first file for a first account and a second file for a second account for each holder of the above type of IC card device. The firs account file is a conventional type file. The second account file is reserved for transactions involving the IC card device. An arbitrary amount can be transferred between the first and second account files.

In accordance with the invention, operations such as "deposit", "withdraw, or draw", "transfer", "remit", "balance inquiry", "print-out of transaction history", and the like can be performed in conjunction with an existing bank account system, thereby enabling considerable savings to be achieved through not having to make major alterations to, or replace outright, the present system. When an IC card is combined with an IC card reader/writer, off-line transactions can be performed. Therefore, transaction using the IC card can be performed outside a bank's normal hours of business, and hence, customer service can be improved.

A remittance list is registered in an IC card as data associated with remittance. When the IC card is inserted in an ATM (Automatic Teller Machine), installed in each branch of a bank, and a specific payee is designated, remittance to a specified bank account can be carried out automatically, i.e. without the need to fill out a detailed bank form, to be handed to a cashier. Thus, the previous cumbersome remittance procedure can be dispensed with, and the risk of error, when filling out the remittance form, can be eliminated, thereby enabling payment into a predetermined account to be accomplished easily and reliably.

Additional payees can be registered in the IC card remittance list as and when required, thereby increasing the versatility and convenience of the card, and thus enabling the bank to provide an improved service to its card-holding customers.

In addition, since a single IC card can be used both as a debit card and a credit card, the number of cards a cardholder needs to carry can be reduced to the minimum, unlike in the conventional case where an individual must carry a number of cards, each designed for a specific purpose. Therefore, the IC card of the invention is much more convenient, versatile, and easier to use.

BRIEF DESCRIPTION OF THE DRAWINGS

For a better understanding of the present invention, reference is made of the following description in conjunction with the accompanying drawings, in which:

FIG. 1 is a diagram showing the entire arrangement according to an embodiment of the present invention;

FIG. 2 is a block diagram showing a circuit arrangement of an IC card used in the embodiment shown in FIG. 1;

FIG. 3 is a block diagram showing a circuit arrangement of a card reader/writer used in the embodiment shown in FIG. 1;

FIGS. 5 to 18B are flow charts for explaining the operation of the embodiment shown in FIG. 1;

FIGS. 19 and 20 are views showing a schematic arrangement of the embodiment shown in FIG. 1; and FIG. 21 is a view for explaining the storage content of a storage memory of the IC card of the embodiment shown in FIG. 1.

DETAILED DESCRIPTION OF THE PREFERRED EMBODIMENT

GENERAL DESCRIPTION

Figure 4:
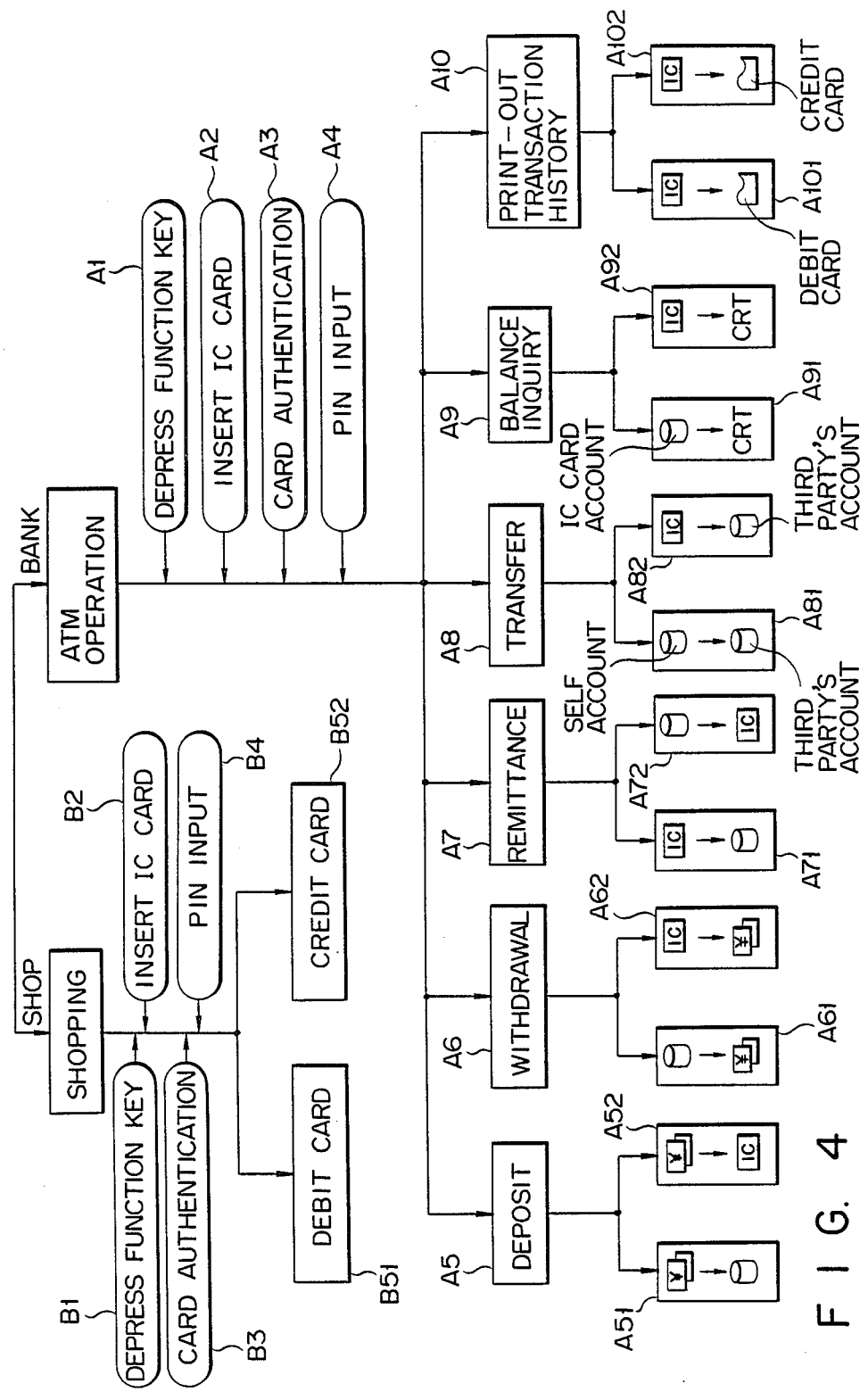
FIG. 4 is a diagram for explaining the overall operation of the embodiment shown in FIG. 1.

FIG. 1 shows the entire IC card system according to an embodiment of the present invention. Reference numeral 1 denotes a main bank. Main bank 1 has host computer 1a. Host computer 1a stores personal accounts of general deposits, IC card accounts, and the like.

Main bank 1 is connected to ATMs (Automatic Teller Machines) 2a and terminals 3a equipped in branches in an on-line manner, and various data communications are made. Main bank 1 is connected to other banks 4, 5, 6, and 7, and various data are exchanged with these banks 4 to 7. In this case, banks 4 to 7 respectively have host computers 4a, 5a, 6a, and 7a.

OVERALL SYSTEM

FIG. 2 shows the circuit arrangement of IC card 10 employed in the IC card system described above. Referring to FIG. 2, system bus 11 is connected to answer-to-reset data ROM 12, application ROM 13, system program ROM 14, working RAM 15, central controller 16, storage memory read/write controller 17, decryptor 18, input controller 20 through input buffer 19, and output controller 22 through output buffer 21. Input and output controllers 20 and 22 are connected to data input/output terminal I/O.

Answer-to-reset data ROM 12 stores all the operating conditions for IC card 10 (e.g., a data write, a supply voltage, a current allowance, a maximum supply voltage, a maximum data transfer volume, a maximum response wait time). These condition data are sent out as answer-to-reset data in accordance with a predetermined format after internal initialization of the card is completed.

Application ROM 13 stores card classification data "APN" indicating a classification of IC card 10. Data "APN" is sent out in accordance with a predetermined format upon attribute exchange after initial parameters are set based on the answer-to-reset data.

System program ROM 14 has code signal "ACK" or "NAC" representing whether or not a supplied signal is correct (acknowledgement, or non acknowledgement), together with various system programs.

Working RAM 15 stores various processed data inside the card.

Central controller 16 outputs operation commands to respective circuits in accordance with operating states and data supplied through input buffer 19.

Storage memory read/write controller 17 controls data read/write access with respect to storage memory 23 in response to the command supplied from central controller 16.

Storage memory 23 includes, a secret zone for storing a personal identification number "PIN", the number of retry "RTN", a decryption code, and the like; a transaction area 230 for storing various history data; debit area 231 for storing data used for a debit card; credit area 232 for storing data used for a credit card; remittance area 233 for storing data used for a remittance card; document creating area 234 for creating a document such as various application forms; and, basic data area 235 for storing common basic data. As shown in FIG. 21, basic data area 235 stores "name", "postal code", "address", and "telephone number" data associated with a cardholder. Debit area 231 stores "bank code", "PIN", "branch number", "type of account (e.g., account of general deposits, time account, and the like)", "account number", "verification code", "invalid code" data, and the like as fixed data 231a, "balance in card" as balance data 231b, and "type", "destination", "terminal number", "deposited/withdrawn amount classification", and "amount" as transaction data 231c. Credit area 232 stores "PIN", "company code", "membership number", "valid data", "invalid code", "floor limit", and "credit limit amount" as fixed data 232a, "credit balance" as balance data 232b, and "data", "type", "destination", "terminal number", and "amount" as transaction data. Remittance area 233 stores the same fixed data as in debit area 231 as fixed data 233a, and, e.g., 10 sets of "data" (remitted data), "type", "branch number", "account number", "amount", "registration number", and "name" (remittee) as transaction data 233b. Document creating area 234 stores "office data", "family data", of the cardholder and "asset data" and "data", "type", and "transaction number" as transaction data 234b in addition to the same fixed data as in debit area 231.

Decryptor 18 decrypts input data supplied through input buffer 19 in accordance with a predetermined algorithm.

The content of storage memory 23 read out by storage memory read/write controller 17 is supplied to one input terminal of comparator 24. Comparator 24 receives at the other input terminal input data decrypted by decryptor 18, data stored in working RAM 15, and the like. The comparison output from comparator 24 is sent to central controller 16.

IC card 10 described above is loaded in ATM 2a equipped in each branch of the bank or IC card reader/writer 30 (to be described later). In the load state, reset signal Reset and system clock signal Clock are supplied to card 10, and Vcc and Vpp power sources are connected thereto. The Vcc power source is adopted as a system drive power source, and the Vpp power source is adopted as a write power source for storage memory 23. A voltage from the power sources is determined by answer-to-reset data written in ROM 12. System clock signal Clock is supplied to the respective circuits through frequency divider 25 as drive signal $\phi$.

IC CARD READER/WRITER

FIG. 3 shows the circuit arrangement of IC card reader/writer 30. IC card 10 is designed to be loaded in the IC card reader/writer 30. Referring to FIG. 3, reference numeral 31 denotes a system bus. System bus 31 is connected to sound controller 32, working RAM 33, system program ROM 34, terminal attribute ROM 35, initial parameter RAM 36, main controller 37, display drive controller 38, key controller 39, reader/writer controller 40, comparator 41, encrypting unit 42 for performing encryption based on the "RSA" algorithm, output controller 43 through output buffer 44, input controller 46 through input buffer 45, latch circuit 47 for latching data "CA", "DES (Data Encryption Standard)" type encryptor 48 based on the DES, "DES" type decryptor 49, and input/output (I/O) controller 50.

Sound controller 32 is connected to loudspeaker 51, and outputs an alarm sound as required.

Working RAM 33 stores "PAN", "CHN", and "EPD" data sent from IC card 10 in its memory area, and also stores various processing data in reader/writer 30.

System program ROM 34 stores various system programs, an ENQ code for matching with IC card 10, and the like.

Terminal attribute ROM 35 stores terminal code TC (e.g., manufacturer's code, issuer code, shop code, and the like) in accordance with its application.

Initial parameter RAM 36 stores answer-to-reset data from IC card 10. RAM 36 is connected, through transmission line 36a, to output controller 43, input controller 46, Vpp level latch 52, Vpp timer latch 53, and Ipp level latch 54. Latches 52, 53, and 54 are respectively connected to Vpp power source 55, Vpp timer 56, and Ipp limiter 57.

Vpp power source 55 is adopted to obtain voltage Vpp used for data write access to the data memory of IC card 10. Vpp timer 56 is adopted to obtain a maximum Vcc application time designated by IC card 10. Ipp limiter 57 is adopted to determine an allowance of data write current.

In this case, a maximum data write voltage determined by Vpp power source 55, a Vpp application time defined by Vpp timer 56, and maximum data write current allowance determined by Ipp limiter 57 are set based on answer-to-reset data stored in initial parameter RAM 36.

Data transmission line 36a is connected to operation frequency selector 58 for the IC card. Selector 58 receives an oscillation signal from oscillator 59 through frequency divider 60, and outputs a signal having a preset operation frequency from the Clock terminal.

System control line 37a of main controller 37 is connected to comparator 41, IPK (Issuer's Public Key) ROM 61, latch 47, encryptor 48, decryptor 49, I/O controller 50, and the like. A control command is supplied to the respective circuits from main controller 37 in accordance with the operating state of the system.

Display driver controller 38 performs display control of display unit 62.

Key controller 39 supplies a key sampling signal to keyboard 63, thereby detecting a key input signal.

Reader/writer controller 40 drives reader/writer mechanism 64. Mechanism 64 comprises a motor for conveying a card, so that IC card 10 inserted from a card insertion port is conveyed to a predetermined position. Mechanism 64 is electrically connected to card 10, and after completion of predetermined processing, returns card 10 to the card insertion port.

This mechanism 64 is connected to output buffer 44, reset controller 65, Ipp level latch 54, operation frequency selector 58, and Vcc power source 66. Mechanism 64 also has the I/O terminal, the Reset terminal, the Vpp terminal, the Clock terminal, and the Vcc terminal which are connected to IC card 10, in correspondence with output buffer 44, reset controller 65, Ipp level latch 57, operation frequency selector 58, and Vcc power source 66.

Input controller 46 and output controller 43 control data exchange with IC card 10 in accordance with a command from main controller 37 supplied through initial parameter RAM 36. Input controller 46 outputs data sent from IC card 10 to working RAM 33 and the like through input buffer 45, and also supplies it to comparator 41. Comparator 41 supplies the comparison output to main controller 37. Output controller 43 sends data sent from terminal attribute ROM 35 to IC card 10 through output buffer 44. Note that the protocol for data exchange between IC card 10 and terminal 30 such as answer-to-reset, attribute exchange, and the like is described in detail in Ser. Nos. 884,279 and 884,280 filed in U.S.A. by the same applicant of the present invention on July 10, 1986, and a detailed description thereof will be omitted.

"RSA" decrypting unit 42 decrypts "PAN" sent from working RAM 33 in accordance with a public key code sent from IPK ROM 61. IPK ROM 61 prestores the public key code corresponding to encrypting code "PRK (Private Key Code)" written in the data memory of IC card 10, and outputs the storage code in response to the command from main controller 37.

Latch 47 outputs data "CA" latched therein to encryptor 48 and decryptor 49. Encryptor 48 receives predetermined data through system bus 31. Encryptor 48 encrypts data "PAN" and the like in RAM 33 on the basis of data "CA" as a key code, and outputs the encryption result to I/O controller 50. Decryptor 49 decrypts encrypted data input to I/O controller 50 on the basis of data "CA", and outputs the decryption result onto system bus 31.

I/O controller 50 is connected to a register (ECR) of a shop, e.g., a supermarket, or to a host computer of a bank to perform data exchange.

VARIOUS SYSTEM OPERATIONS

Various System operations of the embodiment with the above arrangement will now be described.

FIG. 4 is a view for explaining various functions using IC card 10. For example, an on-line transaction is performed through ATM 2a equipped in the branch of the bank as described with reference to FIG. 1. In this case, as shown in FIG. 19, IC card 10 is loaded in ATM 2a, and performs data exchange with main bank 1. In step A1, a function key of main bank 1 is depressed to designate an application. In step A2, IC card 10 is inserted in the card insertion port of ATM 2a. In step A3, card verification is performed. In step A4, a personal identification number of a cardholder is input.

TO DEPOSIT AMOUNT ON ACCOUNT OF GENERAL DEPOSITS

Figure 5:
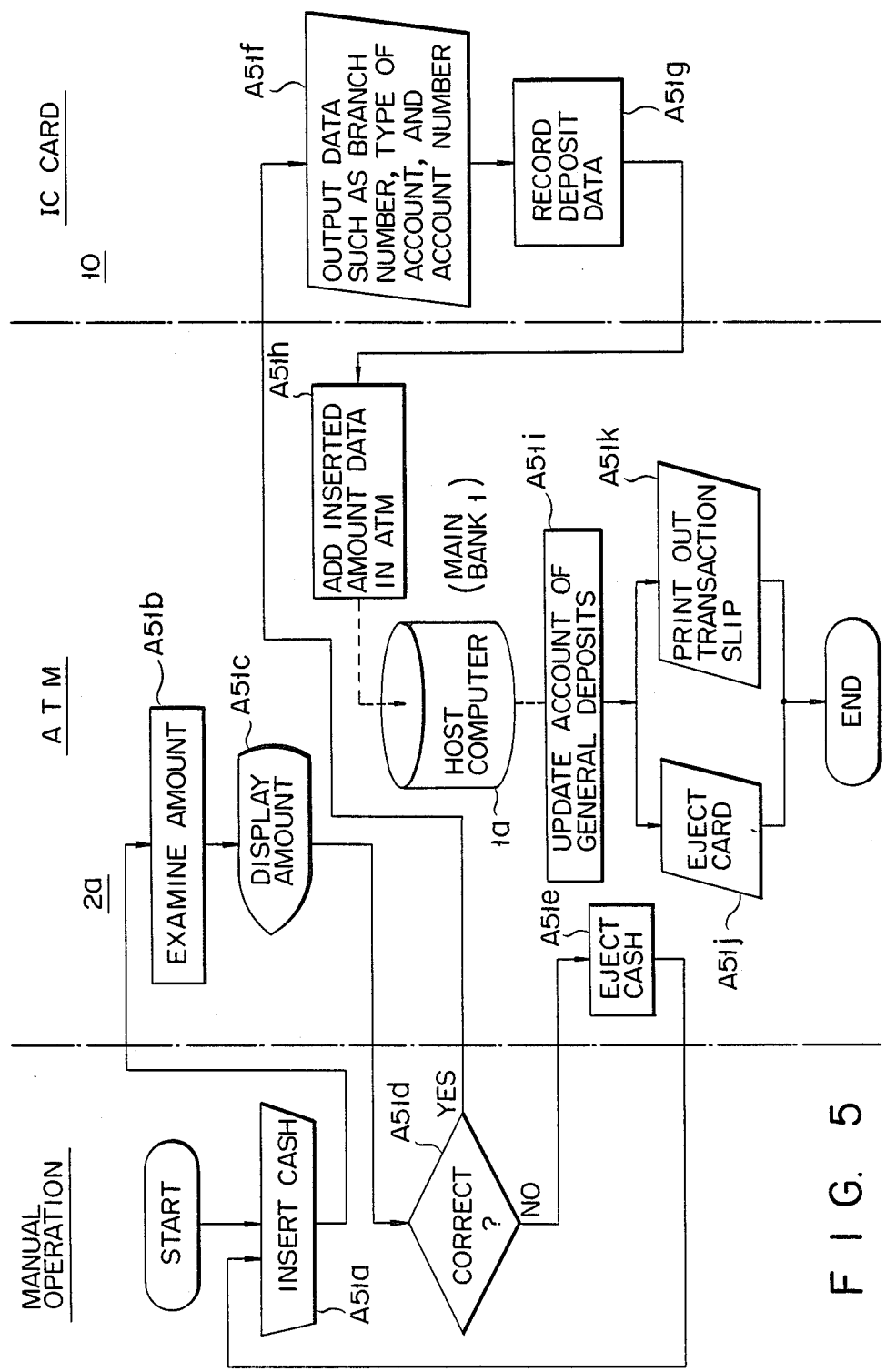

In this state, step A51 in FIG. 5 will be described so as to deposit cash in a own account in step A5 "deposit". In this case, upon manual operation, cash is inserted from cash insertion port of ATM 2a in step A51a. ATM 2a performs examination of the inserted cash, i.e., calculates an amount of cash in step A51b. In step A51c, the calculated amount is displayed. The flow then advances to step A51d.

A customer checks in step A51d whether or not the displayed amount is correct. This checking operation is made upon operation of a "YES" or "NO" key (not shown) provided to ATM 2a. If it is determined upon operation of the "NO" key that the displayed amount is incorrect, the flow advances to step A51e, and the cash is ejected from the cash insertion port of ATM 2a. The flow then returns to step A51a, and the operation is restarted.

If in step A51d, the displayed amount is correct upon operation of the "YES" key, this data is sent to IC card 10, and the flow advances to step A51f. In step A51f, "branch number", "account number", "type of account (account of general deposits, time account, and the like)" data, and the like are read out from storage memory 23 of IC card 10. Subsequently, in step A51g, deposit data is stored in storage memory 23. The data read out from IC card 10 is sent to ATM 2a, and the flow advances to step A51h.

In step A51h, the deposit amount data in ATM 2a is added to data from IC card 10, and the sum data is sent to host computer 1a of main bank 1. In step A51i, a own account of general deposits is designated based on the "account number" and "type of account" data, and the content of this account is updated by the deposit amount. Thereafter, IC card 10 is ejected in step A51j, and a transaction slip is printed out in step A51k. Thus, cash deposit on the self account of general deposits is completed.

TO DEPOSIT AMOUNT ON IC CARD ACCOUNT

Figure 6:
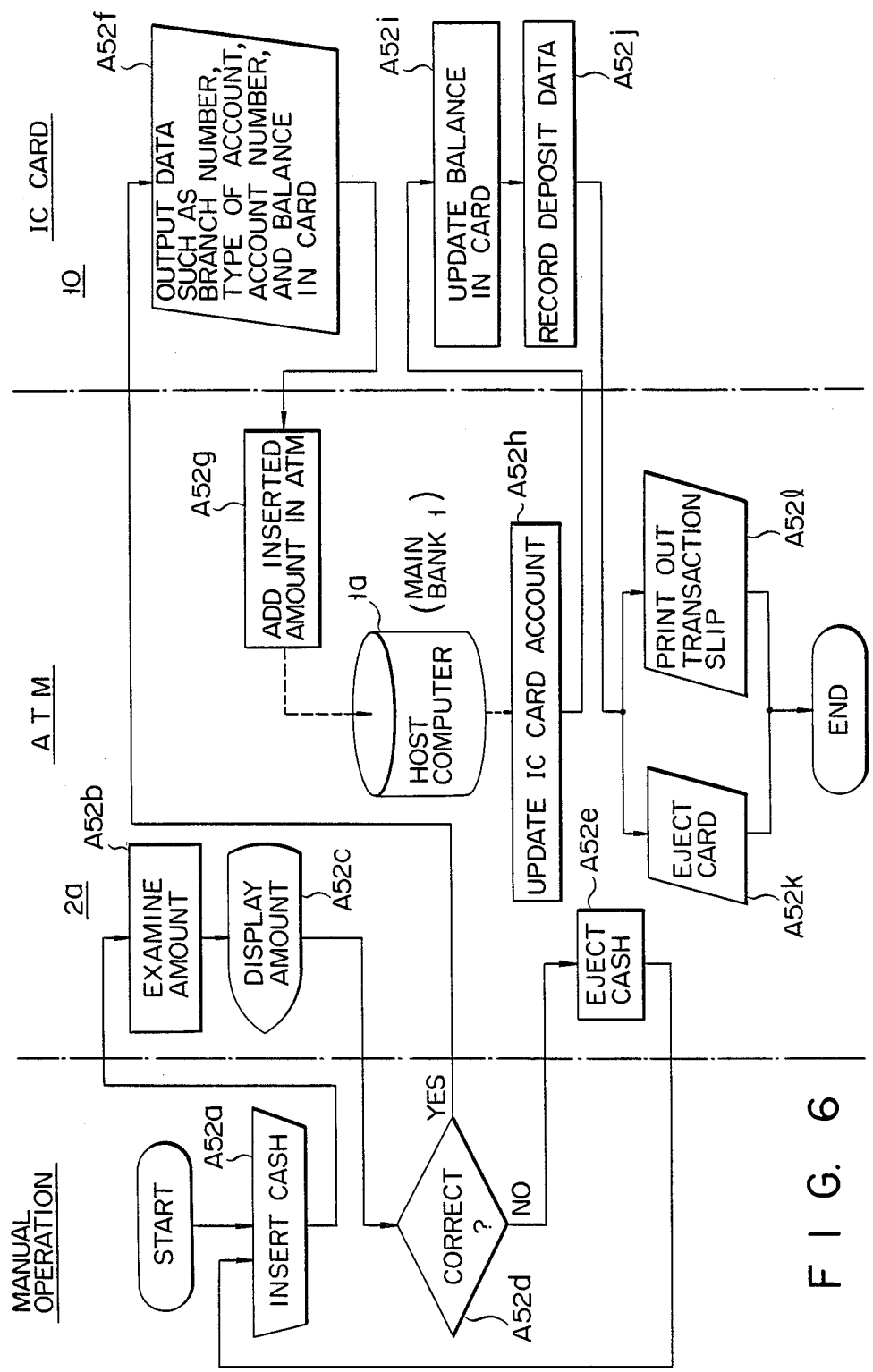

A case of step A52 for depositing cash in an IC card account in step A5 "deposit" will now be described with reference to FIG. 6. In this case, a customer inserts cash from the cash insertion port of ATM 2a in step A52a. In ATM 2a, the amount of cash inserted in step A52b is calculated, and the calculated amount is displayed in step A52c. The flow advances to step A52d.

A check is made in step A52d whether or not the displayed amount is correct in the same manner as in step A51d. If NO in step A52d, the flow advances to step A52e, and the inserted cash is ejected from the cash insertion port of ATM 2a. The flow returns to step A52a, and the operation is restarted.

If YES in step A52d, i.e., if the displayed amount is correct, this data is sent to IC card 10, and the flow advances to step A52f. In step A52f, "branch number", "account number", and "type of account (account of general deposits, time account, and the like)" data are read out from storage memory 23 of IC card 10. The data read out from IC card 10 is sent to ATM 2a, and the flow advances to step A52g.

In step A52g, the deposit amount data is added to the data read out from IC card 10, and the sum data is sent to host computer 1a of main bank 1. A self IC card account is designated based on the "account number" data, the "type of account" data, and the like in step A52h, and the content of this account is updated by the deposit amount The updated data s sent to IC card 10 to update balance data stored in storage memory 23. In step A52j, the deposit data is recorded. Thereafter, in step A52k, IC card 10 is ejected, and in step A52l, a transaction slip is printed out. Thus, deposit on the IC card account is completed.

TO WITHDRAW AMOUNT FROM ACCOUNT OF GENERAL DEPOSITS

A case of step A61A for withdrawing cash from the self account of general deposits in step A6 "withdrawal" will now be described with reference to FIGS. 7A and 7B. In this case, an amount (x) to be withdrawn is input by manual operation in step A61a. In ATM 2a, the input amount (x) is displayed in step A61b. The flow then advances to step A61C.

A customer checks in step A61c whether or not the displayed amount is correct. If NO in step A61c, the flow returns to step A61a, and the operation is restarted.

If it is determined in step A61c that the displayed amount is correct, this data is sent to IC card 10, and the flow advances to A61d. In step A61d, "branch number", "account number", and "type of account (account of general deposits, time account, and the like)" data are read out from storage memory 23 of IC card 10. The data read out from IC card 10 is sent to ATM 2a, and the flow advances to step A61e.

In step A61e, the withdrawal amount data in ATM 2a is added to the data from IC card 10, and the sum data is sent to host computer 1a of main bank 1. In step A61f, a balance (y) is read out from the self account of general deposits based on the "account number" data, "type of account" data, and the like. The flow advances to step A61g, and the withdrawal amount (x) is compared with the account balance (y). If the relation $(x) \leq (y)$ cannot be established, the account balance is smaller than the withdrawal amount, and the flow returns t step A61a. Then, the operation is restarted. If the relation $(x) \leq (y)$ can be established, the flow advances to step A61h, and the content of the self account of general deposits is subtracted by the withdrawal amount. The updated data is sent to IC card 10, and the withdrawal data is recorded in step A61i. Thereafter, in step A61j, cash is dispensed. In step A61k, IC card 10 is ejected, and in step A61l, a transaction slip is printed out. Thus, cash withdrawal from the self account of general deposits is completed.

TO WITHDRAW AMOUNT FROM IC CARD ACCOUNT

Figure 8A:
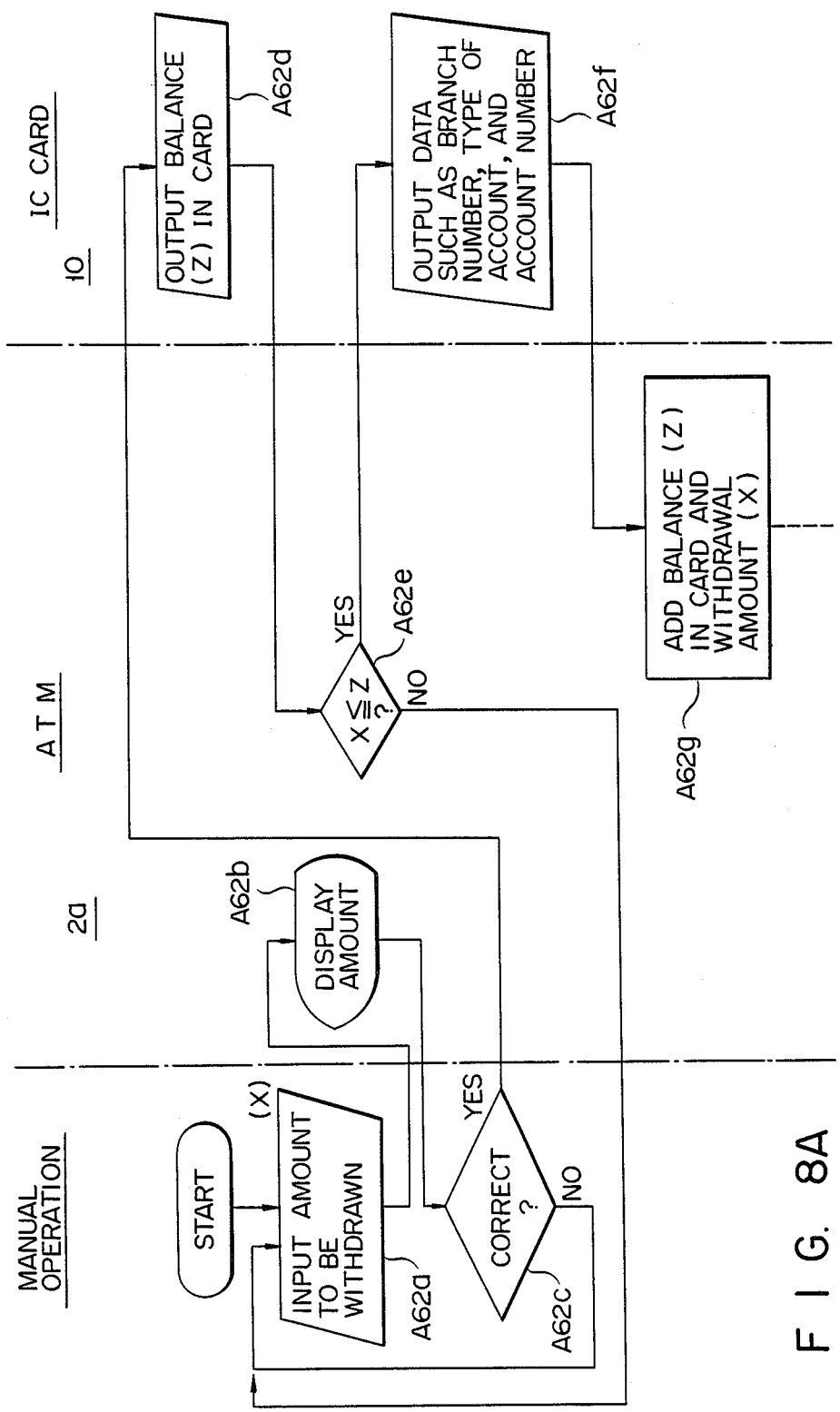
Figure 8B:
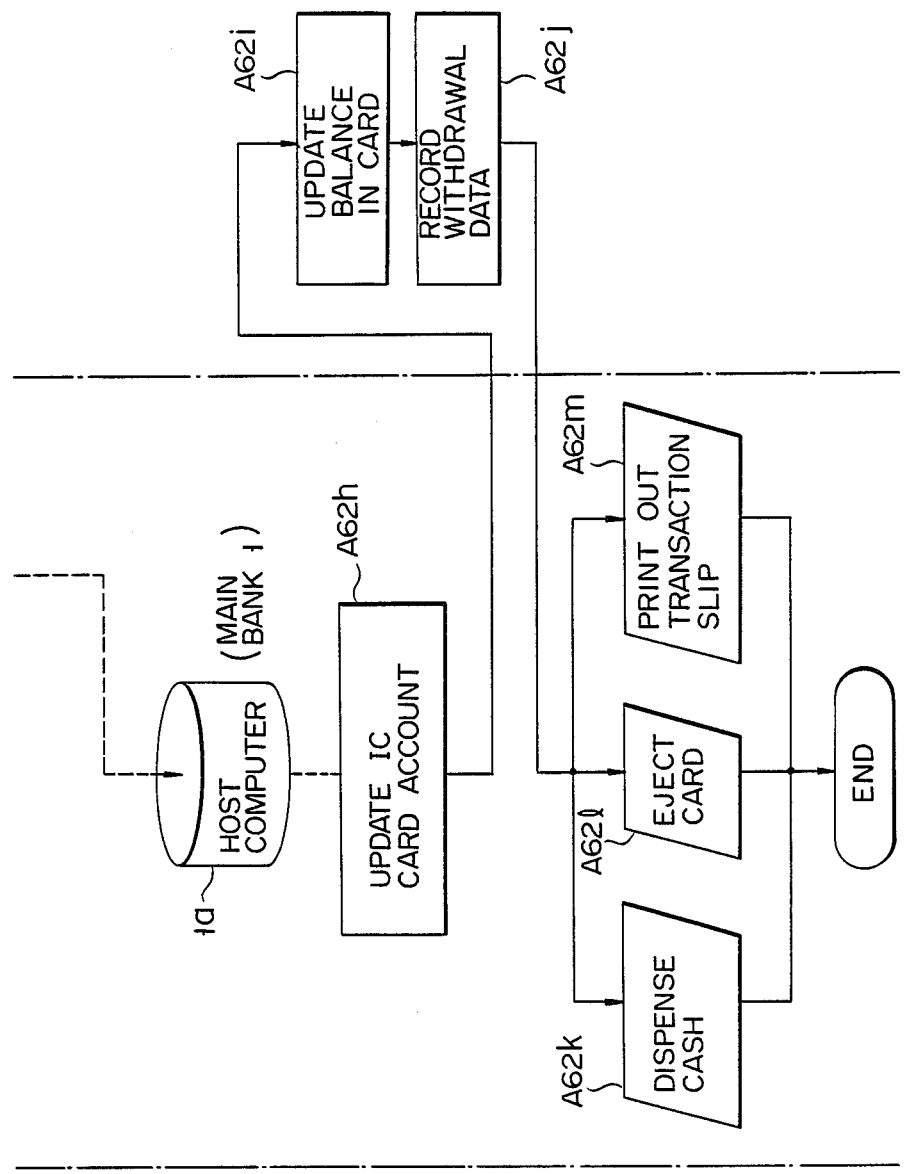

A case of step A62 for withdrawing cash from the IC card account in step A6 "withdrawal" will now be described with reference to FIGS. 8A and 8B. In this case, an amount (x) to be withdrawn is input by manual operation in step A62a. In ATM 2a, the input amount (x) is displayed in step A62b. The program then advances to step A62c.

A customer checks in step A62c whether or not the displayed amount is correct. If NO in step A62c, the flow returns to step A62a, and the operation is restarted.

If a determination is made in step A62c that the displayed amount is correct, this decision data is sent to IC card 10, and the flow advances to A62d. In step A62d, a balance (z) is read out from storage memory 23 of IC card 10. The data read out from IC card 10 is sent to ATM 2a, and the flow advances to step A62e. In step A62e, the withdrawal amount (x) is compared with the account balance (z). If the relationship $(x) \leq (z)$ cannot be established, the account balance is smaller than the withdrawal amount, and the flow returns to step A62a. Then, the operation is restarted. If the relationship $(x) \leq (z)$ can be established, this data is sent to IC card 10, and the flow advances to step A62f. In step A62f, "branch number", "account number", and "type of account (account of general deposits, time account and the like)" data are read out from storage memory 23 of IC card 10. The data read out from IC card 10 is sent to ATM 2a, and the flow advances to step A62g.

In step A62g, the data such as "branch number", "account number", "type of account" and the like from IC card 10 are added to the balance data in IC card 10 and the withdrawal amount data in ATM 2a, and the sum data is sent to host computer 1a of main bank 1. In step A62h, the content of the self IC card account is updated to "z−x". The updated data is sent to IC card 10, and the balance (z) in the card is updated in step A62i. In step A62j, the withdrawal data is recorded. Thereafter, in step A62k, cash is dispensed, and in step A62l, IC card 10 is ejected. In step A62m, a transaction journal is printed out. Thus, cash withdrawal from the IC card account is completed.

TRANSFER AMOUNT FROM IC CARD TO ACCOUNT OF GENERAL DEPOSITS

A case of step A71 for transferring cash from the IC card account to the cardholder's account of general deposits in step A7 "transfer" will b described with reference to FIG. 9. In this case, a transfer amount (x) is manually input in step A71a. In ATM 2a, in step A71b, the input amount (x) is displayed. The flow advances to step A71c.

A check is done in step A71c whether or not the displayed amount is correct. If NO in step A71c, then the flow returns to step A71a, and the operation is restarted.

If a decision is made in step A71c that the displayed amount is correct, this data is sent to IC card 10, and the flow advances to step A71d. In step A71d, a balance (z) is read out from storage memory 23 of IC card 10, and this data is sent to ATM 2a. The flow then advances to step A71e. In step A71e, the transfer amount (x) is compared with the balance (z) in IC card 10. If the relationship (x)≦(z) cannot be established, the balance is less than the amount to be withdrawn, and the flow returns to step A71a. Then, the operation is restarted. If the relationship (x)≦(z) can be established, this data is sent to IC card 10, and the flow advances to step A71f. In step A71f, data such as "branch number", "account number", "type of account (e.g., account of general deposits, time account, and the like)", and the like are read out from storage memory 23 of IC card 10. The data read out from IC card 10 is sent to ATM 2a, and the flow then advances to step A71g.

In step A71g, the data such as "branch number", "account number", "type of account" from IC card 10 is added to the balance data in IC card 10 and the transfer amount data in ATM 2a, and the sum data is sent to host computer 1a of main bank 1. Thus, the content of the IC card account corresponding to the transfer amount (x) is transferred to the account of general deposits, and a file content corresponding to the IC card account is updated to "z−x" in step A71h. The updated data is sent to IC card 10, and the balance (z) in the card is updated in step A71i. In step A71j, the withdrawn data is recorded in step A71k. In step A71k, IC card 10 is ejected, and in step A71l, a transaction slip is printed out. Then, cash transfer from the IC card account to the account of general deposits is completed.

TRANSFER FROM ACCOUNT OF GENERAL DEPOSITS TO IC CARD ACCOUNT

Figure 10B:
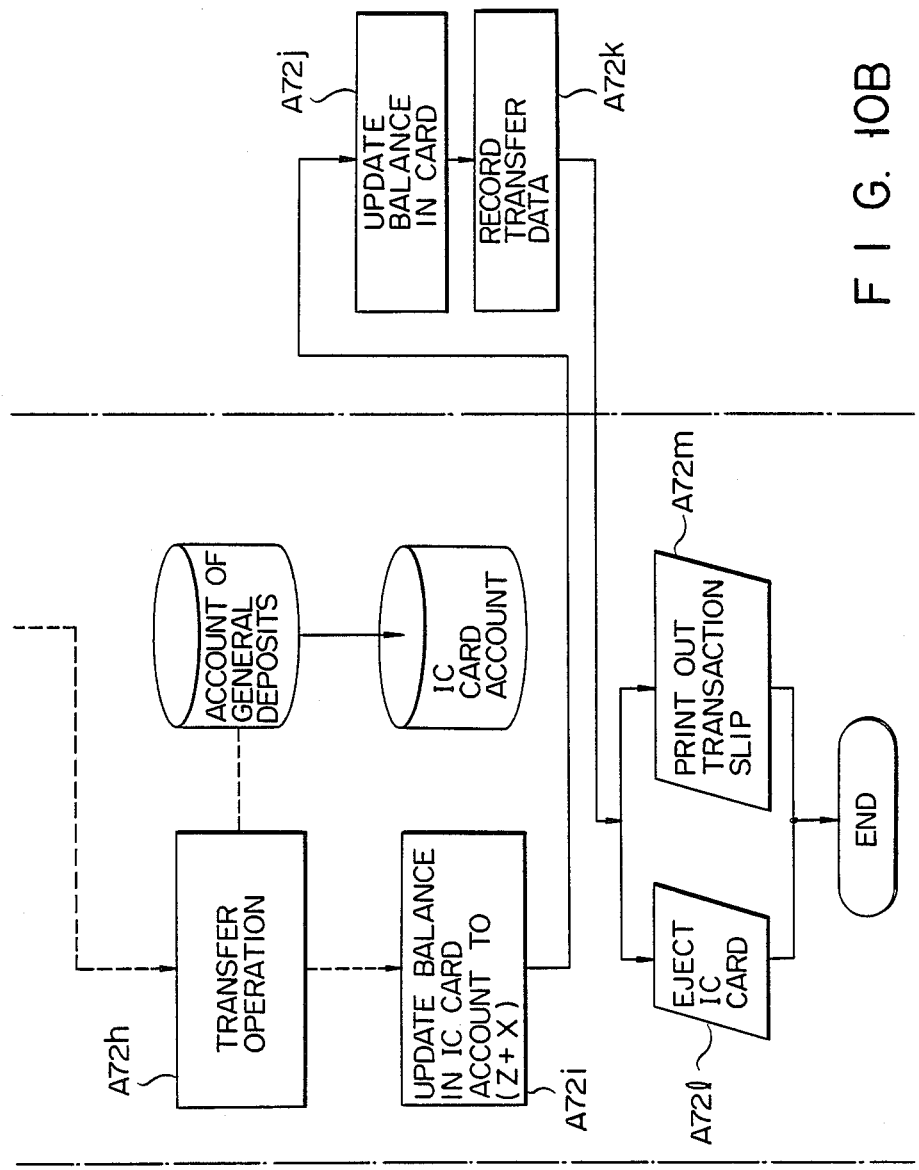

A case of step A72 for transferring cash from the IC card account to the cardholder's account of general deposits in step A7 "transfer" will be described with reference to FIGS. 10A and 10B. In this case, a transfer amount (x) is manually input in step A72a. In ATM 2a, in step A72b, the input amount (x) is displayed. The flow advances to step A72c.

A check is made in step A72c whether or not the displayed amount is correct. If NO in step A72c, the flow returns to step A72a, and the operation is restarted.

If a decision is made in step A72c that the displayed amount is correct, this data is sent to IC card 10, and the flow advances to step A72d. In step A72d, data such as "branch number", "account number", "type of account (account of general deposits, time account, and the like)" are read out from storage memory 23 of IC card 10. The various data read out from IC card 10 are sent to ATM 2a, and the flow advances to step A72e.

In step A72e, transfer amount data in ATM 2a is added to the data read out from IC card 10, and the sum data is sent to host computer 1a of main bank 1. Thus, in step A72f, a balance (y) of the cardholder's account of general deposits is read out. The flow then advances to step A72g, and the transfer amount (x) is compared with the balance (y). If the relationship (x)≦(y) cannot be established, since the account balance is less than the transfer amount, the flow returns to step A72a, and the operation is restarted from the beginning. If the relationship (x)≦(y) can be established, the flow advances to step A72h, and the transfer operation is executed.

In this case, the content of the account of general deposits corresponding to the transfer amount (x) is transferred to the IC card account. In step A72i, a file content corresponding to the IC card account is updated to "z+x". The updated data is sent to IC card 10, and the balance (z) in the card is updated in step A72j. In step A72k, the transfer data is recorded. Thereafter, in step A72l, IC card 10 is ejected, and in step A72m, a transaction slip is printed out. Thus, cash transfer from the account of general deposits to the IC card account is completed.

REMITTANCE FROM ACCOUNT OF GENERAL DEPOSITS TO ANOTHER ACCOUNT OF GENERAL DEPOSITS

A case of step A81 for performing a remittance from the cardholder's account of general deposits to another account of general deposits in step A8 "remittance" will now be described with reference to FIGS. 11A and 11B. In this case, in step A81a, data associated with remittance is read out from IC card 10. More specifically, transaction data 233b is read out from remittance area 233 of storage memory 23. The readout data is sent to ATM 2a, and is displayed as a remittance list in step A81b. The flow advances to step A81c.

A check is made in step A81c whether or not the remittee is present in the list displayed in step A81b. If YES in step A81c, a registration number of the remittee is selected in step A81d. Then, the flow advances to step A81e. If NO in step A81c, the flow advances to step A81f. A check is made in step A81f whether or not the remittance to the original bank is performed. If YES in step A81f, the flow advances to step A81g. Then, data of "type of account", "branch number", and "account number" are input. If NO in step A81f, the flow advances to step A81h, and data of "bank code", "type of account", "branch number", and "account number" are input. Thereafter, the flow advances to step A81e.

In step A81e, an amount to be remitted is input. At the same time, in step A81i, a bankbook is inserted in a bankbook insertion port of ATM 2a. When the amount is input in step A81e, ATM 2a displays the input amount in step A81j. The flow advances to step A81k to allow a customer to check whether or not the displayed amount is correct. If NO in step A81k, the flow returns to step A81e, and the amount is re-input. If YES in step A81k, this data is sent to IC card 10, and the flow advances to step A81l. In step A81l, data such as "branch number", "account number", "type of account (account of general deposits, time account, and the like)", and the like are read out from storage memory 23 of IC card 10. The data read out from IC card 10 is sent to ATM 2a, and the flow then advances to step A81m.

In step A81m, the data read out from IC card 10 is added to the remittance amount data in ATM 2a, and the sum data is sent to host computer 1a of main bank 1. Thus, a balance (y) of the self account of general deposits is read out in step A81n. The flow then advances to step A81o, and the amount (x) to be remitted is compared with the balance (y) of the account of general deposits. If the relation $(x) \leq (y)$ cannot be established, since the balance is less than the amount to be remitted, the flow returns to step A81e, and the operation is restarted from the beginning. If the relation $(x) \leq (y)$ can be established, the transfer operation is executed. In this case, the content of the self or cardholder's account of general deposits is transferred to another account of general deposits according to an intrabank or interbank transfer. After transfer is completed in step A81p, the flow advances to step A81q.

A check is done in step A81q whether or not the current remittee is to be added to the remittance list. If unnecessary, IC card 10 is ejected in step A81r, and a transaction slip is printed out in step A81s. In this manner, remittance from the self, or cardholder's account of general deposits to another account of general deposits is completed. However, if the customer requests additional registration, the flow advances to step A81t to check if the number of items in the list is smaller than 10. If YES in step A81t, an additional registration request is sent to IC card 10, and the additional registration of the remittee list is performed in step A81u. Then, the flow advances to steps 81r and 81s. If NO in step A81t, the flow advances to steps A81r and A81s, and the processing is ended.

The content of the self account of general deposits is recorded on the bankbook inserted in ATM 2a in step A81i, and the bankbook is ejected from the bankbook insertion port in step A81v.

REMITTANCE FROM IC CARD ACCOUNT TO ANOTHER ACCOUNT OF GENERAL DEPOSITS

Figure 12A:
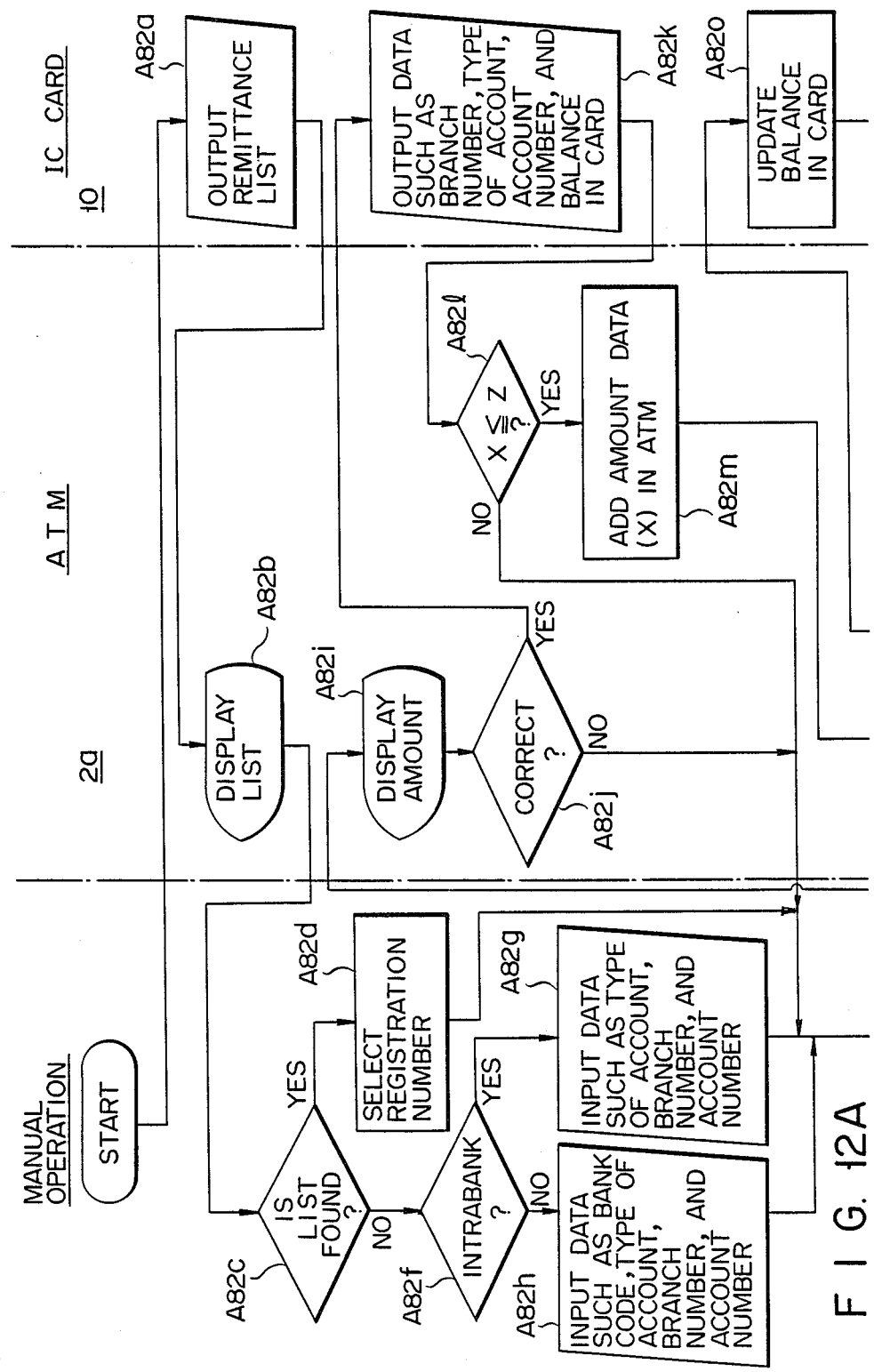

A case of step A82 for performing a remittance from the IC card account to another account of general deposits in step A8 "remittance" will now be described with reference to FIGS. 12A and 12B. Also, in this case, data associated with remittance is read out from IC card 10 in step A82a in the same manner as described above. The readout data is sent to ATM 2a, and is displayed in step A82b. The flow advances to step A82c.

A Check is made in step A82c whether or not the remittee is present in the list displayed in step A82b. If YES in step A81c, the remittee's registration number is selected in step A82d. The flow advances to step A82e. If NO in step A82c, the flow advances to step A82f. It is checked in step A82f whether or not an intrabank remittance is performed. If YES in step A82f, the flow advances to step A82g, and "type of account", "branch number", and "account number" are input. If NO in step A82f, the flow advances to step A82h, "bank code", "type of account", "branch number", and "account number" are input. The flow then advances to step A82e.

In step A82e, an amount to be remitted is input. When the amount is input in step A82e, ATM 2a displays this amount in step A82i. The flow advances to step A82j to check if the displayed amount is correct. If NO In step A82j, the flow returns to step A82e, and the amount input operation is restarted from the beginning. If the customer decides YES in step A82j, the decision data is sent to IC card 10, and the flow advances to step A82k. In step A82k, data such as "branch number", "account number", "type of account (e.g., account of general deposits, time account, and the like)" are read out from storage memory 23 of IC card 10. The data read out from IC card 10 are sent to ATM 2a, and the flow advances to step A82l. In step A82l, the amount (x) to be remitted is compared with the balance (z) of IC card 10. If the relationship (x) (z) cannot be established, since the IC card balance is less than the amount to be remitted, the flow returns to step A82e, and the amount input operation is restarted. If the relationship $(x) \leq (z)$ can be established, the flow advances to step A82m.

In step A82m, the data from the IC card 10 is added to data of the amount (x) to be remitted of ATM 2a, and the sum data is sent to host computer 1a of main bank 1. In this manner, the transfer operation can be executed. In this case, the content of the IC card account is transferred to another account of general deposits by an amount corresponding to the amount (x) to be remitted according to an intrabank or interbank transfer. The flow then advances to step A82n, and the content of the IC card account is updated to "z−x". The updated data is sent to IC card 10.

In step A82o, IC card 10 updates the balance therein, and the transfer data is recorded in step A82p. The flow advances to step A82q, and the current remittee is to be added to the list. If no additional registration is required, IC card 10 is ejected in step A82r, and a transaction slip is printed out in step A82s. Thus, remittance from the self IC card account to another account of general deposits is completed. On the other hand, whether or not the customer requests additional registration of the list in step A82q, the flow advances to step A82t to check if the number of items in the list is smaller than 10. If YES in step A82t, an additional registration request is sent to IC card 10, and additional registration of the remittee list is performed in step A82u. The flow then advances to steps A82r and A82s. If NO in step A82t, the flow directly advances to steps A82r and A82s, thus ending the processing.

BALANCE INQUIRY OF ACCOUNT OF GENERAL DEPOSITS

Figure 13:
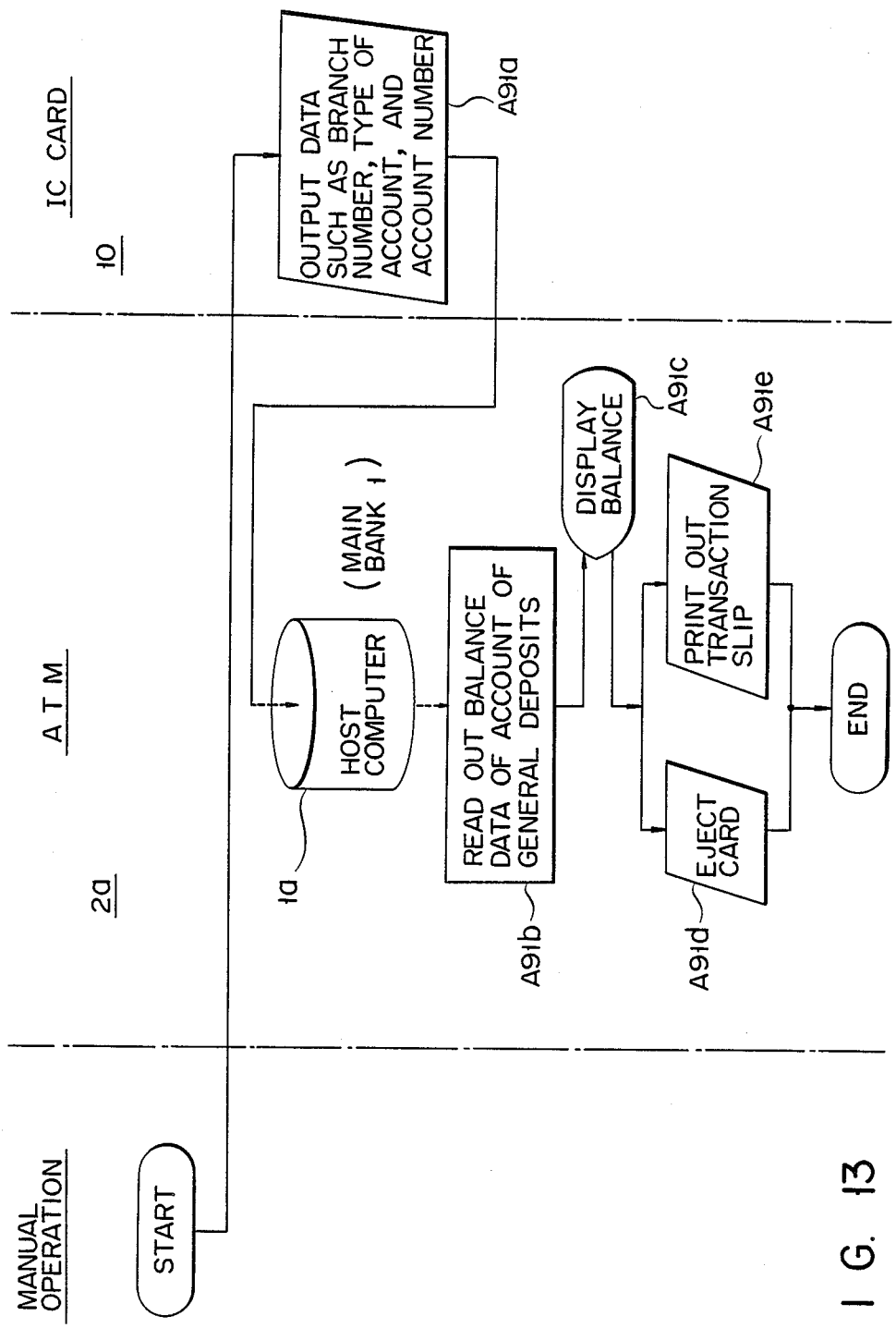

A case of step A91 for inquiring the balance of the self, or cardholder's account of general deposits in step A9 "balance inquiry" will now be described with reference to FIG. 13. In this case, data such as "shop number", "account number", and the like are read out from IC card 10 in step A91a, and are sent to host computer 1a of main bank 1. In step A91b, the balance data associated with the self or cardholder's account of general deposits is read out from host computer 1a, and is displayed in step A91c. IC card 10 is ejected in step A91d, and a transaction slip is printed out in step A91e. Thus, balance inquiry of the self, or cardholder's account of general deposits is completed.

BALANCE INQUIRY OF IC CARD ACCOUNT

Figure 14:
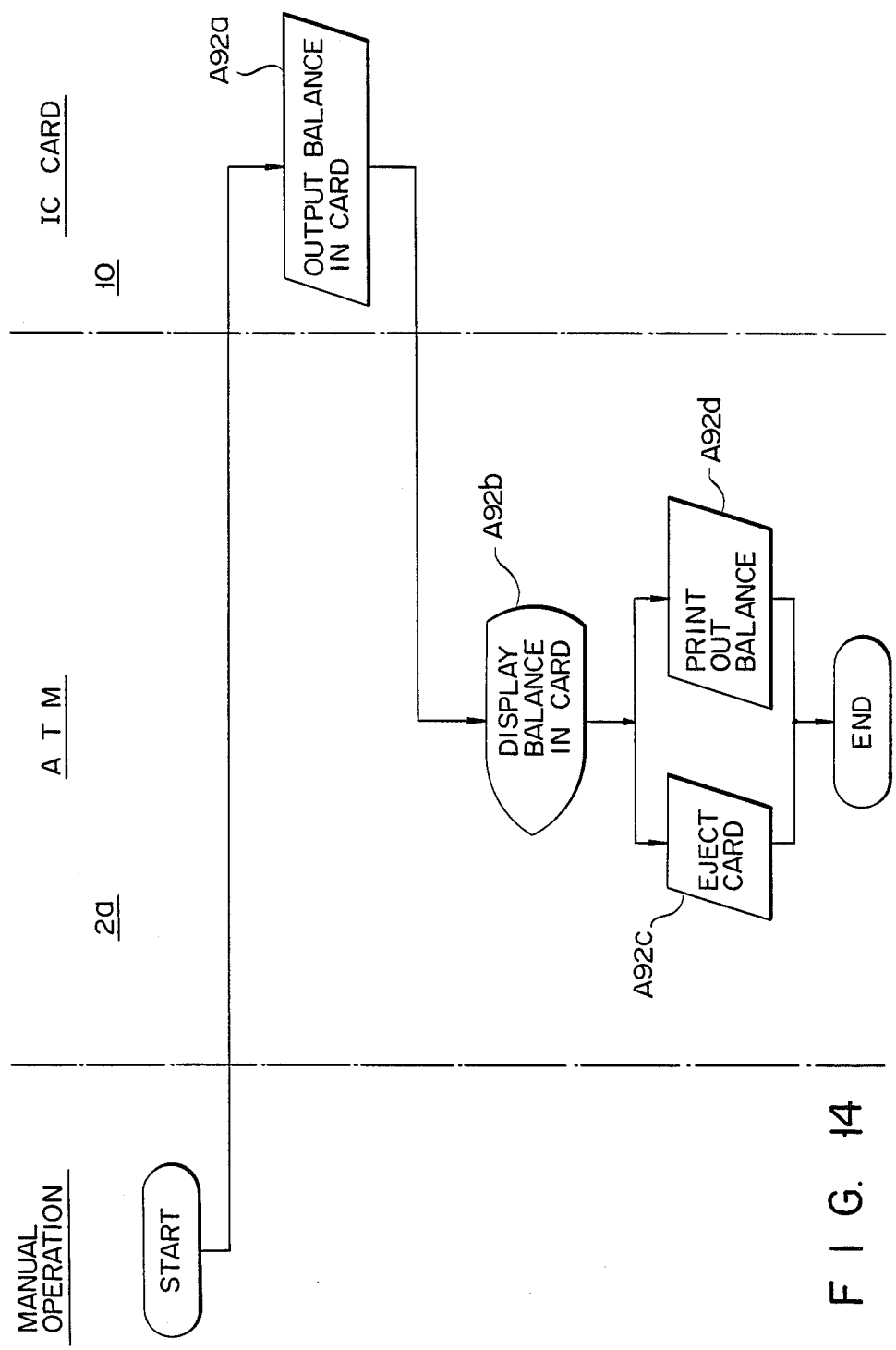

A case of step A92 for inquiring the balance of the IC card account in step A9 "balance inquiry" will now be described with reference to FIG. 14. In this case, balance data is read out from IC card 10 in step A92a, and is sent to ATM 2a. The readout data is displayed on the display unit in step A92b. In step A92c, IC card 10 is ejected, and the balance data is printed out in step A92d. Thus, balance inquiry of the IC card account is completed.

TO PRINTING OUT TRANSACTION HISTORY OF DEBIT CARD

A case of step A101 for printing out a transaction history when IC card 10 is used as a debit card in step A10 "print-out of transaction history" will now be described with reference to FIG. 15. In this case, in step A101a, the debit area is accessed by IC card 10. The flow advances to step A101b to check whether or not data indicating a transaction history is stored in the debit area. If NO instep A101b, this decision data is sent to ATM 2a, and a message indicating no transaction history is displayed in step A101c. If YES in step A101b, the flow advances to step A101d. In step A101d, the data stored in the debit area is read out, and is sent to ATM 2a. In step A101e, IC card 10 is ejected, and in step A101f, the transaction history is printed out. Thus, the print-out operation of the transaction history when IC card 10 is used as the debit card is completed.

PRINTING OUT TRANSACTION HISTORY OF CREDIT CARD

A case of step A102 for printing out a transaction history when IC card 10 is used as a credit card in step A10 "print-out of transaction history" will now be described with reference to FIG. 16. In this case, in step A102a, the credit area is accessed by IC card 10. The flow advances to step A102b to check whether or not data indicating a transaction history is stored in the credit area. If NO in step A102b, this decision data is sent to ATM 2a, and a message indicating no transaction history is displayed in step A102c. If YES in step A102b, the flow advances to step A102d. In step A102d, the data stored in the credit area is read out, and is sent to ATM 2a. In step A102e, IC card 10 is ejected, and in step A102f, the transaction history is printed out. Thus, the print-out operation of the transaction history when IC card 10 is used as the credit card is completed.

USING IC CARD AS DEBIT CARD

A case will be described wherein IC card 10 is loaded in IC card reader/writer 30 equipped in a shop such as a supermarket to perform on-line transaction illustrated in FIG. 4. As shown in FIG. 20, IC card reader/writer 30 is connected to register 70 for calculating a total of purchasing amounts, and data exchange is performed therebetween. First, in step B1 shown in FIG. 4, a function key on keyboard 63 of card reader/writer 30 is operated to designate whether the IC card is used as the debit or credit card. In step B2, IC card 10 is loaded in reader/writer 30. In step B3, card verification is performed, and a self personal identification number is requested in step B4. Control advances to the following operation.

In this state, assume that the IC card is used as the debit card. A case of step B51 will be described with reference to FIG. 17 wherein the IC card is used as the debit card. In this case, fixed data 231a, balance data 231b, and transaction data 231c are read out from debit area 231 of storage memory 23 of IC card 10, and are sent to IC card reader/writer 30. When a purchasing amount is output from register 70 in step B51a, the output amount (s) is input to reader/writer 30 in step B51b. The flow advances to step B51c to compare the amount (s) with the balance. If the relation (s) balance cannot be obtained, NO is determined in step B51c and the flow advances to step B51d. Then, a message indicating a shortage of balance is displayed. A check is done in step B51e whether or not purchasing is to be continued. If NO in step B51e, the processing is ended. However, if YES in step B51e, cash is added in step B51f, and a decreased purchasing amount (s) is input in step B51g. Then, the flow returns to step B51c. If the relationship (s)≦balance can be obtained in step B51c, the flow advances to step B51h, and transaction data is sent to register 70. In step B51i, the data is stored in register 70.

The flow then advances to step B51j. It is checked in step B51j whether or not the number of transactions as the debit card falls within 30. If YES in step B51j, the transaction data is added in step B51k, and the flow advances to step B51l. If NO in step B51j, the earliest data is rewritten in step B51m, and the flow advances to step B51n. In step B51l, the balance of IC card 10 is updated, and a transaction slip is printed out in step B51n. Then, the processing is ended.

USING IC CARD AS CREDIT CARD

Figure 18A:
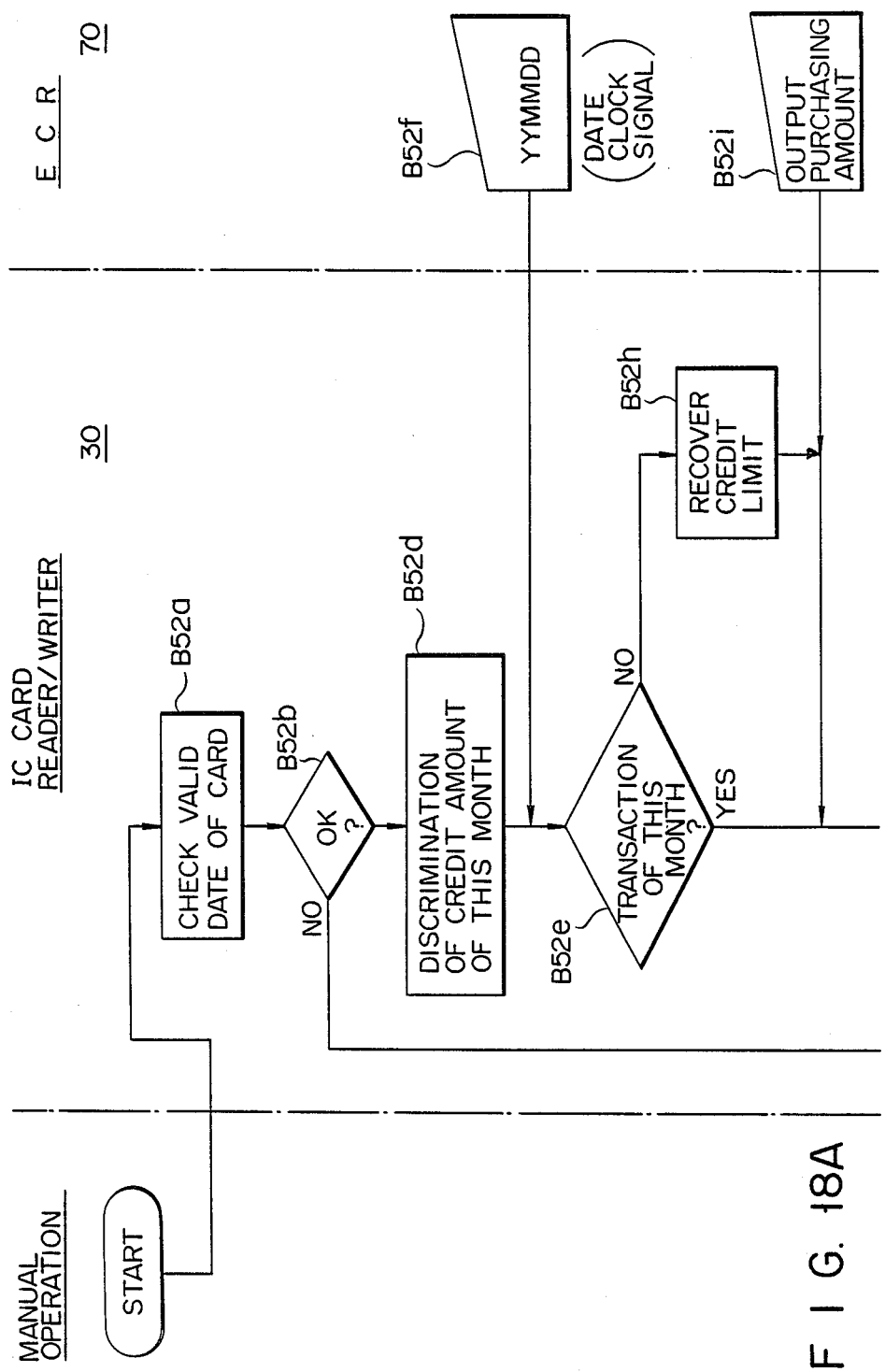
Figure 18B:
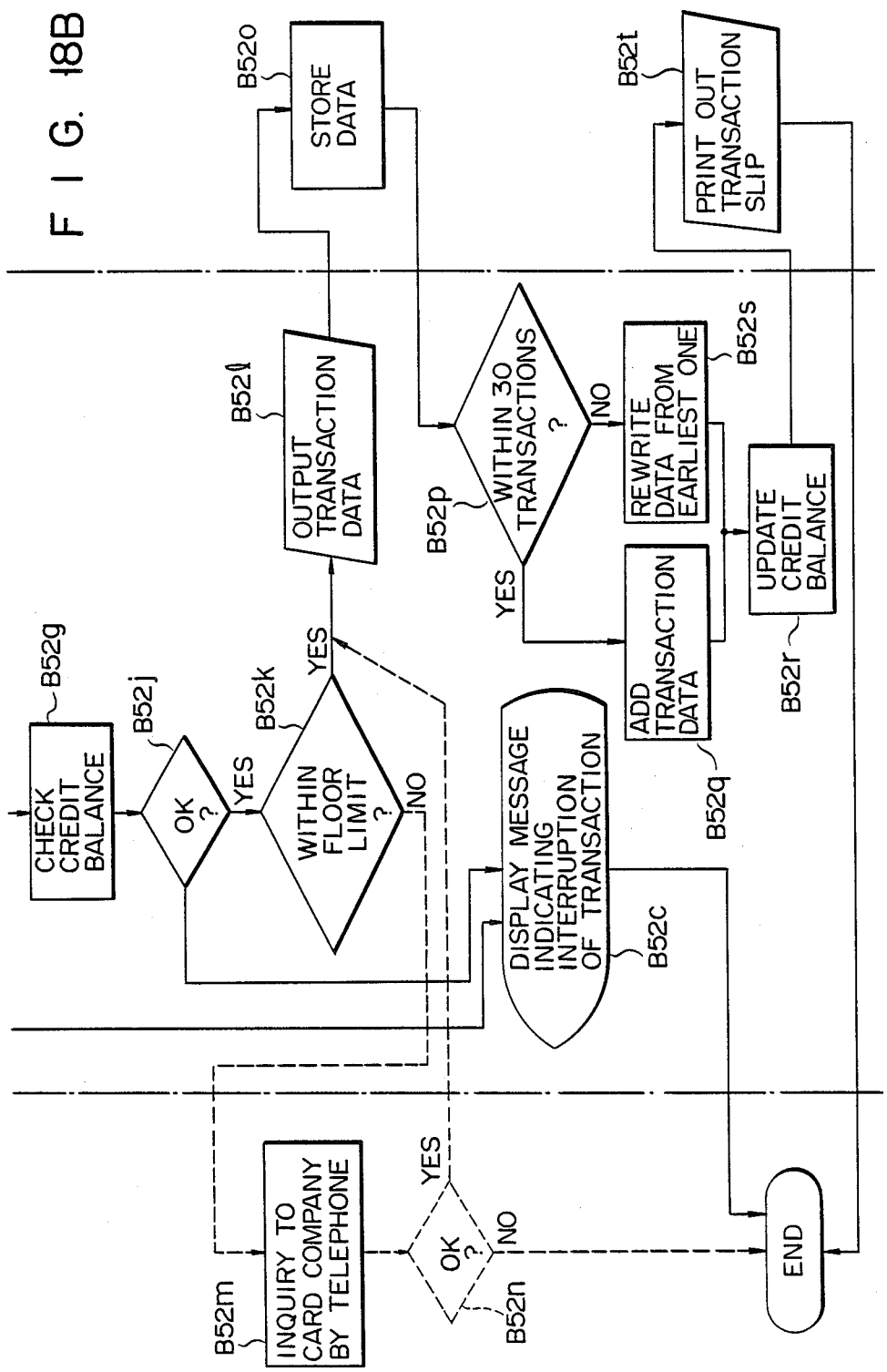

A case of step B52 will be described with reference to FIGS. 18A and 18B wherein the IC card is used as the credit card. In this case, fixed data 232a, balance data 232b, and transaction data 232c are read out from credit area 232 of storage memory 23 of IC card 10. In step B52a, the valid date of the card is checked. If NO in step B52b, a message indicating a transaction interruption is displayed, and the processing is ended. However, if YES in step B52b, the flow advances to step B52d for decision of a credit amount of this month. It is then checked in step B52e if this transaction corresponds to a credit amount of this month. In this case, in step B52f, a clock signal associated with date is supplied from register 70.

If YES in step B52e, the flow advances to step B52g. If NO in step B52e, a credit limit is recovered in association with the next month, and the flow then advances to step B52g. In step B52g, input of the purchasing amount from register 70 in step B51i is awaited, and then a credit balance is checked. If NO is obtained in step B52j, a message indicating a transaction interruption is displayed, and the processing is ended. If YES in step B52j, the flow advances to step B52k. A check is made in step B52k whether or not the purchasing amount is less than the floor limit. If YES in step B52k, the flow advances to step B52l. If NO in step B52k, the flow advances to step B52m. In step B52m, a sales clerk inquires a card company on the phone. Then, if YES cannot be obtained in step B52n, the processing is ended. If YES in step B52n, the flow advances to step B52l. In step B52l, transaction data is sent to register 70. The data is stored in register 70 in step B52o.

The flow advances to step B52p. A check is effected in step B52p whether or not the number of transactions as the credit card is smaller than 30. If YES in step B52p, the transaction data is added, and the flow advances to step B52r. If NO in step B52p, the earliest data is rewritten in step B52s, and the flow advances to step B52r. In step B52r, the balance of IC card 10 is updated, and a transaction slip is printed out in step B52t. Thus, processing is ended.

What is claimed is:

1. An IC card system, comprising:
   an IC card device containing at least one IC (integrated circuit) chip which includes:
   first memory means, for storing personal identification number (PIN) data;
   first comparing means for comparing said PIN data, stored in said first memory means, with externally entered PIN data; and
   second memory means, said second memory means having:
   a first area for storing data for a debit function, and
   a second area for storing data for a credit function;
   said IC card system further including
   a terminal device for communicating various items of data to said IC card device when said IC card device is inserted in said terminal device, the terminal device including selecting means for determining whether said IC card device is to be used as a debit card or a credit card, said selecting means being arranged to be activated when said first comparing means detects a coincidence of said PIN data.

2. An IC card system according to claim 1, wherein said data for a debit function includes at least balance data, and said data for a credit function includes at least credit balance data.

3. An IC card system according to claim 2, wherein said terminal device further includes:
   second means for comparing a transaction amount with one of the balance data stored in said first area and the credit balance data stored in said second area, and means for determining the validity of a transaction performed with said card, on the basis of the comparison result of said second comparing means.

4. An IC card system according to claim 3, said terminal device further including means for causing said first and said second areas to store balance data which is updated by subtracting said transaction amount from the previous balance data, in accordance with the type of card being used.

5. An IC card system, comprising:
   an integrated circuit (IC) card device containing at least one IC chip that includes
   first memory means for storing personal identification number (PIN) data,
   comparing means for comparing said PIN data, stored in said first memory means, with externally entered PIN data,
   second memory means for storing a card holder's account number corresponding to the IC card device, and
   third memory means for storing a number of account numbers for enabling remittance to an account of a respective third party;
   a terminal device for communicating various items of data to said IC card device when said IC card device is inserted in said terminal device; and
   a host computer installed at a bank and coupled to said terminal device, the host computer having an IC card account file;
   said IC device further including output means for outputting (a) the card holder's account number as stored in said second memory means, and (b) a number of other account numbers stored in said third memory means to said terminal device when said comparing means detects a coincidence; and
   said host computer further including remitting means for remitting a predetermined amount of money from an account designated by the card holder's account number as transferred from said IC card device, to an account designated by one of the other account numbers as transferred from said IC card device.

6. An IC card system according to claim 5, wherein said terminal device includes keyboard means, so that the PIN data can be entered by said keyboard means.

7. An IC card system according to claim 6, wherein the predetermined amount of money is inserted by operation of said keyboard means.

8. An IC card system according to claim 5, wherein said terminal device includes display means for displaying a number of account numbers of third parties as transferred from said IC card device, and select means for selecting one of said third party account numbers.

* * * * *